United States Patent [19]
Nakagawa et al.

[11] Patent Number: 5,740,135
[45] Date of Patent: Apr. 14, 1998

[54] DISC REPRODUCING APPARATUS CAPABLE OF SELECTING A PREDETERMINED DISC

[75] Inventors: Munekazu Nakagawa, Higashihiroshima; Kazunori Iwaki, Kamo-gun; Norihiro Kurokawa, Higashihiroshima, all of Japan

[73] Assignee: Sharp Kabushiki Kaisha, Osaka, Japan

[21] Appl. No.: 407,636

[22] Filed: Mar. 21, 1995

[30] Foreign Application Priority Data

May 24, 1994 [JP] Japan .................................. 6-109980

[51] Int. Cl.$^6$ .................................................. G11B 17/22
[52] U.S. Cl. .................................................. 369/34; 369/178
[58] Field of Search .................................. 369/53–54, 58, 369/34, 36–38, 191, 192, 194, 178; 360/92

[56] References Cited

U.S. PATENT DOCUMENTS

| | | | |
|---|---|---|---|
| 3,690,680 | 9/1972 | Lumney et al. | 369/37 |
| 4,674,077 | 6/1987 | Yoshimoto et al. | 369/374 |
| 4,695,990 | 9/1987 | Kawakami | 369/38 |
| 5,036,503 | 7/1991 | Tomita | 369/34 |
| 5,058,090 | 10/1991 | Ueno et al. | 369/34 |
| 5,107,474 | 4/1992 | Ishibashi et al. | 369/34 |
| 5,136,562 | 8/1992 | Staar | 369/34 |
| 5,164,929 | 11/1992 | Kurosawa et al. | 369/34 |
| 5,193,079 | 3/1993 | Ko et al. | 369/37 |
| 5,267,225 | 11/1993 | Fukasawa et al. | 369/36 |
| 5,293,362 | 3/1994 | Sakurai et al. | 369/37 |
| 5,357,495 | 10/1994 | Solhjell | 369/38 |
| 5,524,002 | 6/1996 | Morita et al. | 369/191 |

FOREIGN PATENT DOCUMENTS 60-52951   3/1985   Japan .
6-349184  12/1994   Japan .

Primary Examiner—Stuart S. Levy
Assistant Examiner—Brian E. Miller

[57] ABSTRACT

A disc reproducing apparatus which allows an uncomplicated and precise operating control reducing number of parts used and without increasing the size of structure of the apparatus is disclosed. In this disc reproducing apparatus, a first portion, to be detected, forms a disc number detecting mark. The first portion has a width smaller than a width of a second portion, to be detected, which a stop position detecting mark. At the same time, the disc number detecting mark and the stop position detecting mark are provided on a straight line. Thus, the disc number detecting mark and the stop position detecting mark can be detected by one mark sensor with both marks reliably distinguished from each other.

11 Claims, 26 Drawing Sheets

FIG.26 PRIOR ART

|  | SENSOR 601 | SENSOR 602 | SENSOR 603 |
|---|---|---|---|
| DISC MOUNT PORTION 521 | H | H | H |
| DISC MOUNT PORTION 522 | L | H | L |
| DISC MOUNT PORTION 523 | L | H | H |
| DISC MOUNT PORTION 524 | H | L | H |
| DISC MOUNT PORTION 525 | H | H | L |

DISC REPRODUCING APPARATUS CAPABLE OF SELECTING A PREDETERMINED DISC

CROSS-REFERENCE TO RELATED APPLICATIONS

This application is related to application Ser. No. 08/219,272 filed on Mar. 29, 1994, now U.S. Pat. No. 5,524,002 commonly assigned with the present invention.

BACKGROUND OF THE INVENTION

1. Field of the Invention

The present invention relates to disc reproduction apparatuses, and more particularly, it is concerned with a disc reproduction apparatus having a disc change function which is capable of selecting and reproducing a predetermined disc out of a plurality of discs.

2. Description of Related Art

Conventionally, a disc reproduction apparatus of the above type has been known including a disc reproduction apparatus having a roulette type disc changer and a disc reproduction apparatus having a stocker type disc change. In a roulette type disc reproduction apparatus, a plurality of discs are mounted annually on a circular disc table. A desired disc is transferred to a disc reproduction portion by turning the disc table clockwise or anticlockwise for reproducing from the desired disc. In a stocker type disc reproduction apparatus, a plurality of discs are accommodated in a stocker at a predetermined pitch. A desired disc can be selected by vertically moving the stocker. The selected disc is caught by a disc moving means and transferred to a disc reproduction portion for reproducing from the selected disc.

In the disc reproduction apparatus having the above roulette type disc changer, however, the diameter of the disc table becomes larger in proportion to the increase of a number of discs loaded, thereby increasing significantly the size of the apparatus itself.

On the other hand, in the disc reproduction apparatus having the above stocker type disc changer, the size of the stocker itself is not so much increased relative to increase of a loadable number of discs because discs are accommodated by disposing one above the other at the predetermined pitch. However, such an apparatus requires a complex operation for disc selection in which the stocker is moved vertically to fetch a disc from the stocker and then the disc is transferred to the disc reproduction portion. This necessarily increases complexity of a mechanism for implementing such an operation, at the same time the weight of such a mechanism is increased. Also, there is another disadvantage in that time required to replace discs is made longer due to the complex operation.

Typically, the disc reproduction apparatus having the roulette type or the stocker type disc changer is combined with a portable radio cassette recorder referred generally to as "LAZICASAY". In so doing, the disc table of the roulette type disc changer has to be made significantly large relative to the size of LAZICASAY itself. Therefore, it has been difficult to combine the disc reproduction apparatus with LAZICASAY. In the case of the stocker type disc changer, its portability is impaired due to the weight increase in accordance with increase in complexity of the structure. Thus, there has been a disadvantage in that such an apparatus is not so much suitable for combination with LAZICASAY which requires portability.

With the above in view, the applicant of the present invention has proposed in U.S. patent application Ser. No. 08/219,272 now U.S. Pat. No. 5,524,002 a disc reproduction apparatus having a disc tray array in which disc trays capable of mounting one disc are coupled successively in series. In this disc reproduction apparatus, a disc tray on which a desired disc is mounted is selected from the disc tray array, and then the disc tray is transferred to a reproduction portion to be reproduced. The present invention is made to realize an easier control of a disc tray transfer means of the disc reproduction apparatus which has been proposed by the same applicant.

One conventional example, which is closest to the control of the disc tray transfer means of the present invention, is a turn table control means of a roulette type.

First, description will be made below as to structure and control of a conventional roulette type turn table. FIG. 20 is the plan view showing a rotating mechanism and a reproducing unit of a conventional roulette type turn table, and FIG. 21 is a front view showing an elevating and lowering means of the reproducing unit.

Referring to FIG. 20, disc mounting portions 521–525 are provided equally spaced from a center 500a of rotation of a turn table 500 and equally spaced from each other. A gear 500b is formed on the outer periphery of turn table 500. Gear 500b is in mesh with a gear 503 which is provided at an output shaft of a motor 502 capable of rotating forward and backward.

Referring to FIGS. 20 and 21, a disc reproducing unit 501 includes a pickup (not shown) for reading a recorded surface of a disc. Disc reproducing unit 501 engages a cam 505 at one end thereof. Cam 505 is rotated by a motor 504 capable of rotating forward and backward. Disc reproducing unit 501 is moved vertically by rotation of cam 505.

On the outer periphery of turn table 500 are provided recesses 511c–515c respectively corresponding to disc mounting portions 521–515. A tip end of a lock lever 507 which is turned by a plunger 506 is fitted into these recesses 511c–515c, thereby maintaining turn table 500 at a position where a desired disc is reproduced.

FIG. 22 is a plan view showing a bottom surface of the turn table shown in FIG. 20. Referring to FIG. 22, on the rear surface of turn table 500 are provided projections for detecting a disc number 511d–515d corresponding to disc mounting portions 521–525. The number of these projections 511d–515d corresponds to the number of discs. Also, projections for detecting a stopping position 511e–515e are formed correspondingly to disc mounting portions 521–525 for detecting that disc mounting portion 521–525 reaches right before a normal position of disc reproducing unit 501. It is noted that all of these projections 511e–515e have the identical width.

A sensor 509 is provided to face projections 511d–515d, and a sensor 510 is provided to face projections 511e–515e. Also, an elevation detecting switch (not shown) for the reproducing unit is provided to detect completion of elevation of the reproducing unit.

In order to identify a disc number, sensor 509 for detecting a disc number counts the projections for detecting a disc number until sensor 510 for detecting a stopping position detects the projection for detecting a stopping position after detecting the previous projection. The disc number is identified based on this count value. For example, assuming that turn table 500 turns clockwise in FIG. 22 and sensor 509 detects projection 513d having three projections during the period from passing projection 512e to detecting projection 513e, then a disc mounting portion which comes to be placed on disc reproducing unit 501 is determined to be disc mounting portion 523.

Now, description will be made below as to a transfer operation from the state in which disc mounting portion 521 is located above disc reproducing unit 501 to the state in which disc mounting portion 523 is located above disc reproducing unit 501.

(1) First, disc reproducing unit 501 is lowered by rotation of motor 504.

(2) The elevation detecting switch (not shown) for detecting elevation of the reproducing unit is switched off, so that a timer is actuated.

(3) After a predetermined time required for turn table 500 to turn has elapsed, motor 502 start rotating, whereby turn table 500 start rotating clockwise.

(4) After a predetermined time has elapsed, motor 504 stops rotating, thereby completing lowering of disc reproducing unit 521.

(5) After sensor 510 detects projection 511e and until sensor 510 detects projection 512e, sensor 509 detects projection 512d for detecting a disc number having two projections. Projection 512d, however, is not projection 513d for detecting a disk number of disc mounting portion 523, so that motor 502 continues rotation.

(6) After sensor 510 detects projection 512e and until sensor 510 detects projection 513e, sensor 509 detects projection 513d for detecting a disc number having three projections thereby identifying a desired disc mounting portion 223, so that motor 502 stops its rotation. Turn table 500 continues rotation by inertia force even after motor 502 stops.

(7) Next, plunger 506 is operated, and when turn table 500 comes to be placed at a proper position, a tip end of lock lever 507 is fitted into recess 513c thereby preventing turn table 500 from turning so as to keep that position.

(8) After completion of turning of turn table 500, motor 504 starts rotation, whereby disc reproducing unit 501 starts to elevate.

(9) The elevation detecting switch (not shown) for detecting elevation of the reproducing unit is turned on thereby stopping rotation of motor 504. Thus, the operation of the disc changer is completed.

FIG. 23 is a block diagram showing the control means of the above-described conventional roulette type disc reproducing apparatus. Referring to FIG. 23, a controller on mechanical side 560 consists of a motor 502 for transferring disc mounting portion, a disc number detecting sensor 509, and a stop position detecting sensor 510. A control circuit 550 consists of a central control unit 531, a memory 535, a timer 532, an input port 534 and an output port 533. To a part of numbers of memory 535 are allotted a counter 535a, a current tray number 535b and a target tray number 535c.

A motor driving circuit 542 and photosensor light source driving circuits 541 and 540 are connected to output port 533. Input port 534 receives signals supplied from stop position detecting sensor 510, disc number detecting sensor 509, and a tray select switch 539 for selecting a predetermined disc tray. Motor 502 for transferring disc mounting portion receives a signal from motor driving circuit 542, stop position detecting sensor 510 receives a signal from photosensor light source driving circuit 541, and disc number detecting sensor 509 receives a signal from photosensor light source driving circuit 540.

In this structure, while the output of stop position detecting sensor 510 is determined by control circuit 550, motor driving circuit 542 is controlled in response to the determination to drive motor 502 for transferring disc mounting portions. Thus, the output of disc number detecting sensor 509 is counted while the disc mounting portions are transferred, thereby identifying the disc number.

In the structure of the conventional control means shown in FIG. 23, however, a disc number of the disc tray located on disc reproducing unit 501 cannot be identified at the time of power-on. Therefore, as shown in FIG. 24, a control means in which a disc number is recorded in a non-volatile memory 543 such as an EEPROM (Electrically Erasable Programmable Read Only Memory) and that the contents of memory 543 are read when the power supply is turned on has conventionally been proposed. With this control means, the disc number can be identified even in a stationary state.

In the meanwhile, another control method of the conventional roulette type disc changer has been proposed as will be described below. FIG. 25 is a conceptual view for use in explaining such a conventional control method. Referring to FIG. 25, assume that, for example, five kinds of disc numbers are to be identified, then three sensors 601, 602 and 603 as well as three sign trains 611–615 including stop position detecting signs and disc number detecting signs are respectively disposed at each stop position. This method utilizes the fact that signal outputs of sensors 601–603 attain an H level when sign trains 611–615 are detected by sensors 601–603. More specifically, as shown in FIG. 26, the disc number of five disc mounting portions 521–525 can be identified by means of combinations of signals of three sensors 601–603. Also, the disc number can be identified even in a stationary state, since sign trains 611–615 are disposed at stop positions.

As described above, various control methods have been proposed for controlling the disc reproducing method having the conventional roulette type disc changer.

However, with the first control method out of the above-described control methods, it is necessary to move the disc mounting portion at the time of power-on and to count the number of disc number detecting signs of the disc mounting portion by the sensor, in order to identify the disc number. This provides the need of transfer operation of the disc mounting portion which is not originally required, thereby incurring a waiting time for a user, or generating a noise due to movement. This method also requires two sign trains and two sensors thereby inhibiting a realization of a smaller and thinner apparatus.

A problem of the control method which has been described above, secondly is that since the non-volatile memory is used to identify the disc number in the stationary state at the time of turn a on of the power supply, the apparatus becomes very expensive. There is another problem in this method in that tasks required for the control circuit to control the non-volatile memory are remarkably increased.

In the control method which has been described with reference to FIGS. 25 and 26, there are as many as three sensors used, whereby an area required for arranging the sign trains corresponding to those sensors is also increased, thereby inhibiting realization of a smaller and thinner apparatus. The large number of sensors also increases the amount of current consumed by the sensors as well as interconnections, thus remarkably increasing the cost of the apparatus.

SUMMARY OF THE INVENTION

One object of the present invention is to control a transfer operation of a disc tray in a disc reproducing apparatus without complicating a structure of the apparatus.

Another object of the present invention is to realize an easier control of a transfer operation of a disc tray in a disc reproducing apparatus.

According to one aspect of the present invention, a disc reproducing apparatus includes a disc tray array, a disc reproducing portion, a disc tray transfer portion, a disc number detecting mark, a stop position detecting mark, a mark sensor, and a drive control portion. The disc tray array includes a plurality of disc trays for placing a disc, those plurality of disc trays being movably connected with each other. The disc reproducing portion is provided for reproducing a disc placed on a disc tray selected from the disc tray array. The disc tray transfer portion serves to transfer the selected disc tray to the disc reproducing portion. The disc number detecting mark is provided on each of the plurality of disc trays and is formed by at least a first portion to be detected for identifying each disc tray. The stop position detecting mark is provided on each of the plurality of disc trays and is formed by a second portion to be detected having a width wider than that of the first portion to be detected of the disc number detecting mark, thereby detecting the disc tray having reached a predetermined position of the disc reproducing portion. The mark sensor serves to detect the disc number detecting mark and the stop position detecting mark. The drive control portion controls at least driving of the disc tray transfer portion based on a detection result of the mark sensor.

In this disc reproducing apparatus, the disc number detecting mark and the stop position detecting mark are provided on a straight line along a moving direction of the disc tray, whereby the disc number detecting mark and the stop position detecting mark can be detected by one mark sensor. This avoids complication of structure of the apparatus. Also, the disc number detecting mark is detected after detection of the first stop position detecting mark until detection of the next stop position detecting mark, such that the disc tray only needs to be moved by 1 disc to determine the disc number.

According to another aspect of the present invention, in the disc reproducing apparatus, a distance between the disc number detecting mark and the stop position detecting mark is made larger than an interval between adjacent first portions to be detected of the disc number detecting marks and a time taken to detect an unmarked portion is measured by a timer, whereby an identifying portion identifies whether the detection time of the unmarked portion is longer or shorter than a predetermined time. Therefore, even if the detection time of the first portion to be detected of the disc number detecting mark is made longer due to variation of load during the detection, the disc number detecting mark can be identified easily without an error as long as the detection time of the unmarked portion before detecting the first portion to be detected is determined to be shorter than the predetermined time.

According to still another aspect of the present invention, a second portion to be detected of the stop position detecting mark has a width wider than that of a first portion to be detected of the disc number detecting mark in the disc reproducing apparatus. A first signal caused by the disc number detecting mark is determined if the mark detection time is shorter than a first preset time, and a second signal caused by the stop position detecting mark is determined if the mark detection time is longer than the first preset time. A distance between the disc number detecting mark and the stop position detecting mark is made larger than an interval between first portions to be detected of the disc number detecting mark. If the detection time of the unmarked portion is longer than a second preset time, then a signal detected after the second preset time is temporarily determined to be the second signal caused by the stop position detecting mark. Therefore, even if the detection time of the first portion to be detected of the disc number detecting mark is made longer due to variation of load during detection, the detected signal of the first portion to be detected is not determined by mistake as the second portion to be detected of the stop position detecting mark as long as the detection time of the unmarked portion before detecting the first portion to be detected is shorter than the second preset time. Thus, an error can be prevented.

According to still another aspect of the present invention, a disc reproducing apparatus includes a disc mounting portion, a disc reproducing portion, a reproducing portion moving portion, a disc transfer portion, a drive control portion, a portion for holding a position of disc mounting portion, a driving source, a portion for prohibiting disc transfer operation, and a portion for prohibiting movement of reproducing portion.

In such a disc reproducing apparatus, the disc position holding portion is operated so that the portion for prohibiting movement of the reproducing portion is released, and at the same time, the portion for prohibiting disc transfer operation is operated. In the meanwhile, the portion for holding a position of the disc mounting portion is moved from its operational position so as to release the portion for prohibiting disc transfer operation and also to operate the portion for prohibiting movement of the reproducing portion. Therefore, the disc reproducing portion is not moved until after the disc transfer operation is completed. Also, the disc transfer is not carried out until after movement of the disc reproducing portion is completed. Therefore, it is unnecessary to confirm completion of transfer operation of the disc and moving operation of the disc reproducing portion, thereby reducing an operating time as well as the number of detection parts for confirming completion of operations.

According to still another aspect of the present invention, in the disc reproducing apparatus, the disc number detecting mark has a width inherent to each disc mounting portion, and each width is different from that of the stop position detecting mark. Therefore, the disc number can be detected by only one mark sensor, with the disc number detecting mark being clearly distinguished from the stop position detecting mark.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 26 is a table showing comparison between an output of each sensor and a disc number in the detection system shown in FIG. 25.

DESCRIPTION OF THE PREFERRED EMBODIMENTS

Embodiments of the present invention will be described below with reference to the attached drawings.

Figure 1:
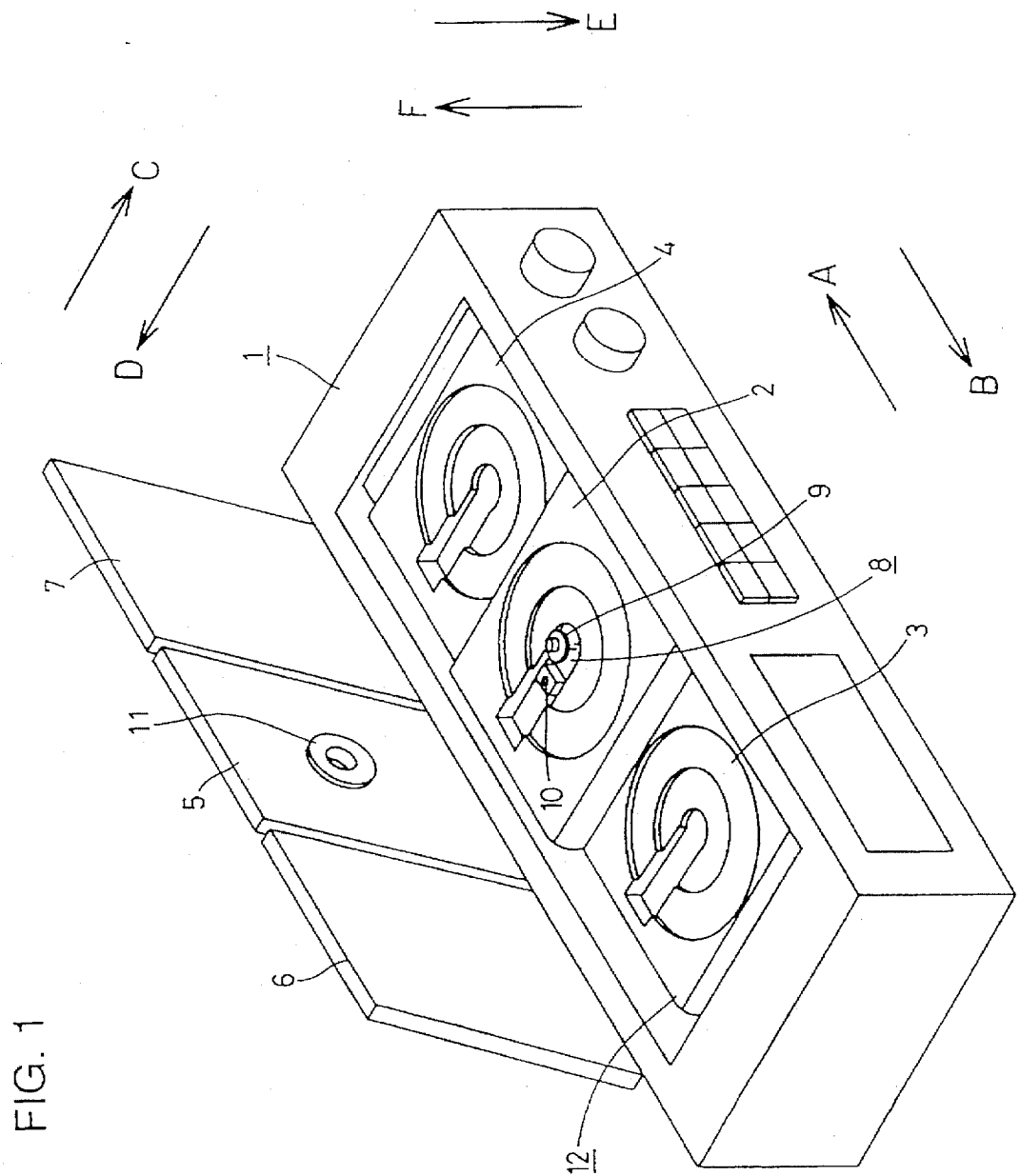
FIG. 1 is a perspective view showing an overall appearance of a disc reproducing apparatus according to one embodiment of the present invention.

With reference to FIG. 1, a disc reproduction apparatus according to one embodiment of the present invention is provided with a disc reproducing portion 2 mounted on a top surface of a main body 1 of the apparatus. Tray storing portions 3 and 4 are provided on both sides of disc reproducing portion 2. Lids 5–7 capable of being opened and closed are mounted on respective openings on the top surface of disc reproducing portion 2 and tray storing portions 3 and 4. Disc reproducing portion 2 is provided with a reproducing unit 8 including a turn table 9 for mounting a disc and an optical pick-up 10 for reading information from the disc. Reproducing unit 8 is lowered to a recessed position as a disc tray array described below is moved, and reproducing unit 8 is elevated to a play position when a desired disc tray is set in disc reproducing portion 2. When moved to the play position, reproducing unit 8 picks up a disc from the disc tray by means of turn table 9. Accordingly, the disc is sandwiched between turn table 9 and a stabilizer 11 attached inside of lid 5 so as to be held stably.

Figure 2:
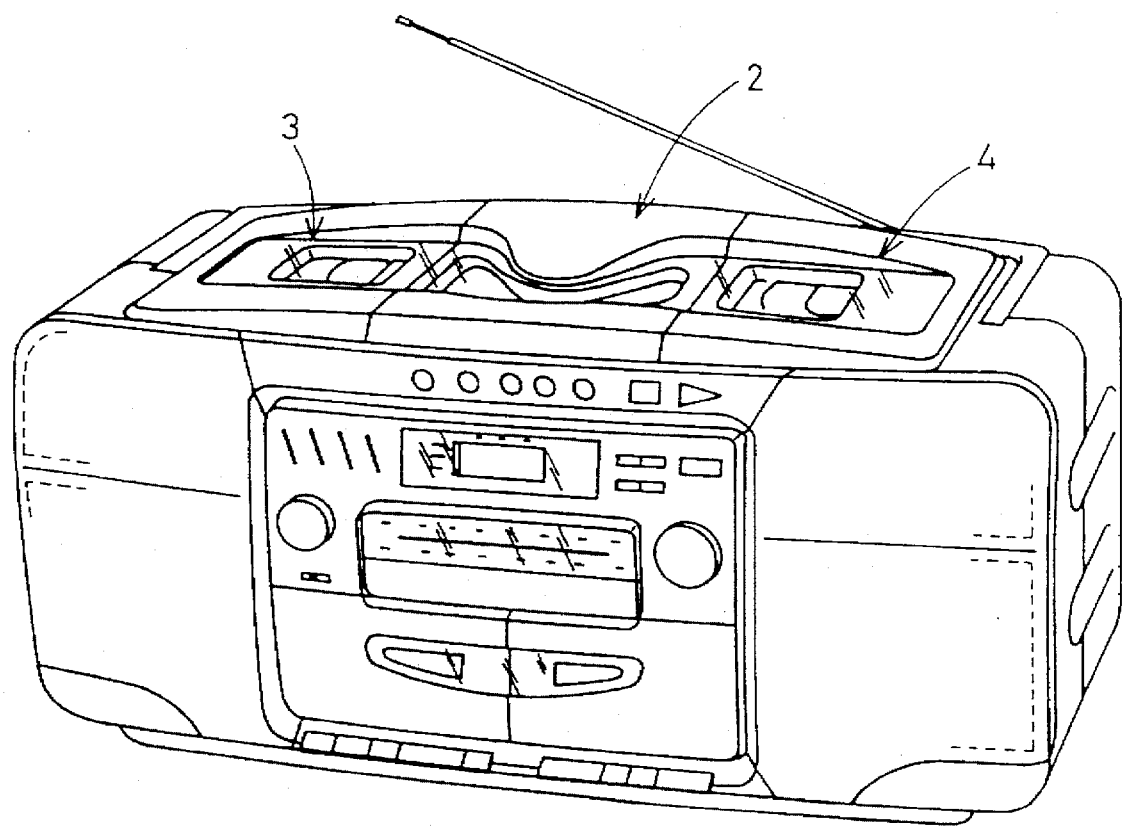
FIG. 2 is a perspective view showing the disc reproducing apparatus according to one embodiment of the present invention which is incorporated into and combined with a portable radio cassette recorder.
Figure 3:
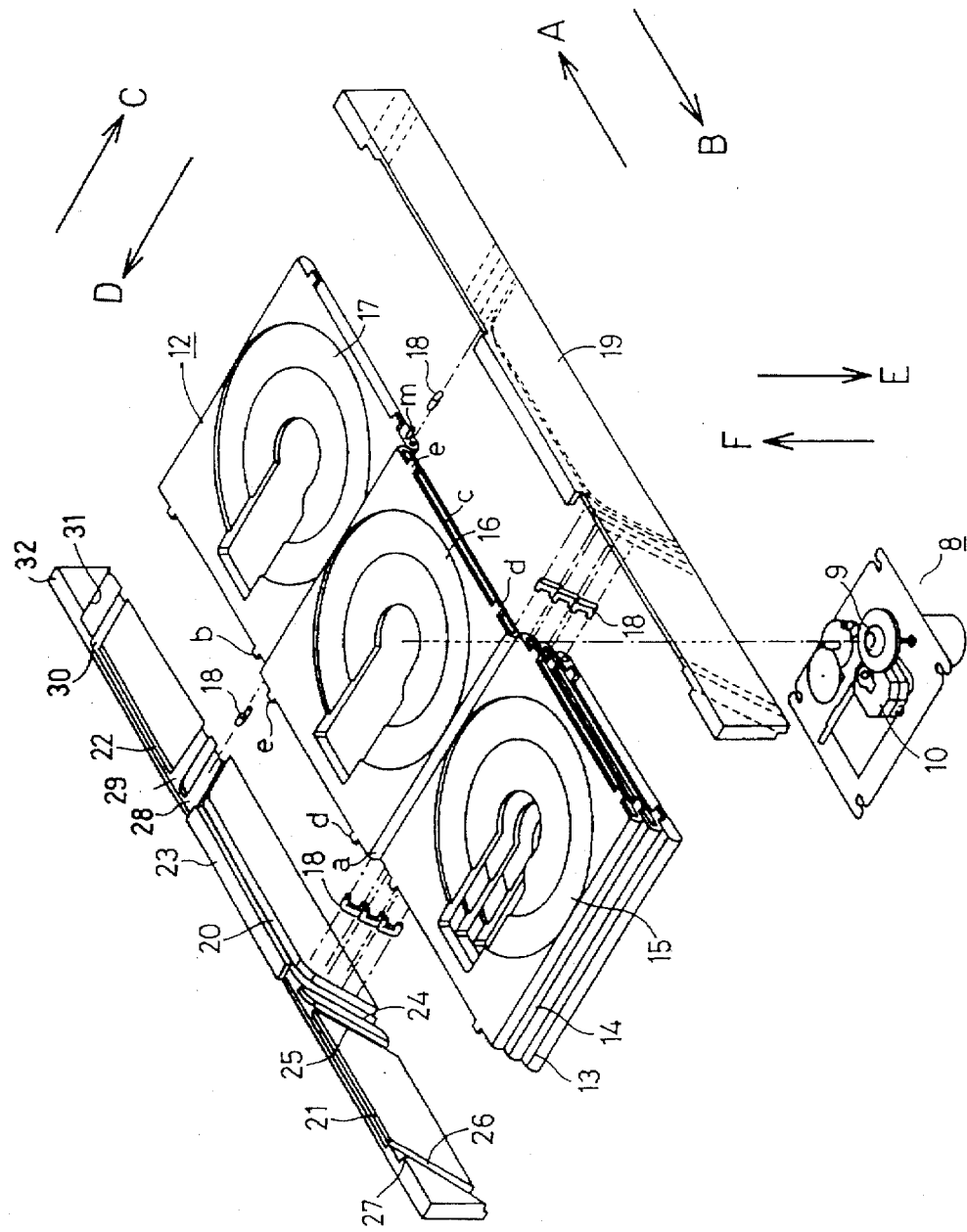
FIG. 3 is an exploded perspective view showing a disc changer portion of the disc reproducing apparatus shown in FIG. 1.

Next, referring to FIGS. 1–3, a disc tray array 12 consisting of a plurality of disc trays 13–17 connected in series is movably provided in main body 1 of the apparatus. Disc tray array 12 can move between both tray storing portions 3 and 4 disposed in such a position as to sandwich disc reproducing portion 2. In this embodiment, disc tray array 12 is illustrated by successively connecting five disc trays 13–17 in series. Each disc tray 13–17 is formed so that both ends thereof along a direction of connection (i.e., a direction of movement) is in an arc shape. In the following description, an arc face located on the left end of each disc tray 13–17 is referred to as a left arc face a, and an arc face located on the right end is referred to as a right arc face b for sake of the convenience.

A groove c extending in a direction of connection is formed on both side faces of respective disc trays 14–16 disposed in the middle of disc tray array 12. Both ends of each groove c is in an arc shape which is concentrical to left arc face a or right arc face b. Also, a pair of guiding projections d and e which are spaced by a predetermined distance in a direction of connection are provided at upper edges of both side faces of respective disc trays 13–17.

Disc trays 13–17 are connected with each other by means of a joint 18 so that the disc trays can turn and slide with respect to adjacent disc tray.

Now, a mechanism for guiding transfer of each disc tray 13–17 will be described below. A horizontal movement guiding mechanism is formed by: a horizontal guiding groove 20 located across a width of disc reproducing portion 2 for helping horizontal movement by receiving edge portion on both sides of each disc tray 13–17; horizontal guiding paths 21 and 22 located across a width of tray storing portions 3 and 4 and disposed at the same height as horizontal guiding path 20 for helping horizontal movement by receiving guiding projections d and e of each disc tray 13–17; and a flange 23 disposed at least above horizontal guiding path 20 and located across a width of disc reproducing portion 2 for preventing the disc tray moving along horizontal guide groove 20 from being floated. Horizontal guide grooves 20, 21, and 22 and flange 23 are formed on opposite sides of a pair of side plates 19 and 32 disposed facing to each other.

An inclined movement guiding mechanism consists of inclined guiding grooves 24, 25, 26, 28, 29, and 30 together with inclination blocking faces 27 and 31. These inclined guiding grooves and inclination blocking faces are formed on opposite sides of the pair of side plates 19 and 32 disposed facing to each other.

Disc trays 13–17 are moved as disc tray 16 located at a reproducing position is driven in a direction of an arrow A and an arrow B by means of a disc tray transfer means which will be described below. Assuming that disc tray 16 at the reproducing position receives a driving force in a direction of arrow A, then disc tray 16 is moved in the direction of arrow A, since guiding projections d and e are guided into horizontal guiding grooves 20 and 22.

At this time, disc tray 16 in the reproducing position is elevated so that disc tray 16 overlaps disc tray 17 included in the right tray storing portion 4. When this horizontal movement is completed, disc tray 16 is somewhat lowered obliquely from the reproducing position to the right with keeping its horizontal position, as disc tray 16 is guided into right inclined guiding grooves 28, 29 and 30. Accordingly, disc tray 17 placed in tray storing portion 4 is also lowered to some extent.

On the other hand, disc tray 15 placed in left tray storing portion 3 is pulled via joint 18 in a direction of arrow A by means of disc tray 16 placed in the reproducing position. Accordingly, disc tray 15 is guided into inclined guiding grooves 24, 25, and 26 which are going up to the right so that disc tray 15 is somewhat elevated obliquely. Further, disc tray 15 is moved horizontally in a direction of arrow A through horizontal guiding grooves 20 and 21 to reach the reproducing position. Disc trays 14 and 13 placed under disc tray 15 in left disc storing portion 3 are respectively elevated obliquely to some extent through guiding grooves 24, 25, and 26. Disc tray 16 placed in the reproducing position is thereby accommodated on the top face of right tray storing portion 4.

In the event that disc tray 16 placed in the reproducing position is driven in a direction of arrow B, movement direction is merely reversed, so that description thereof will not be repeated. Disc trays 13–17 are thus transferred.

Figure 4:
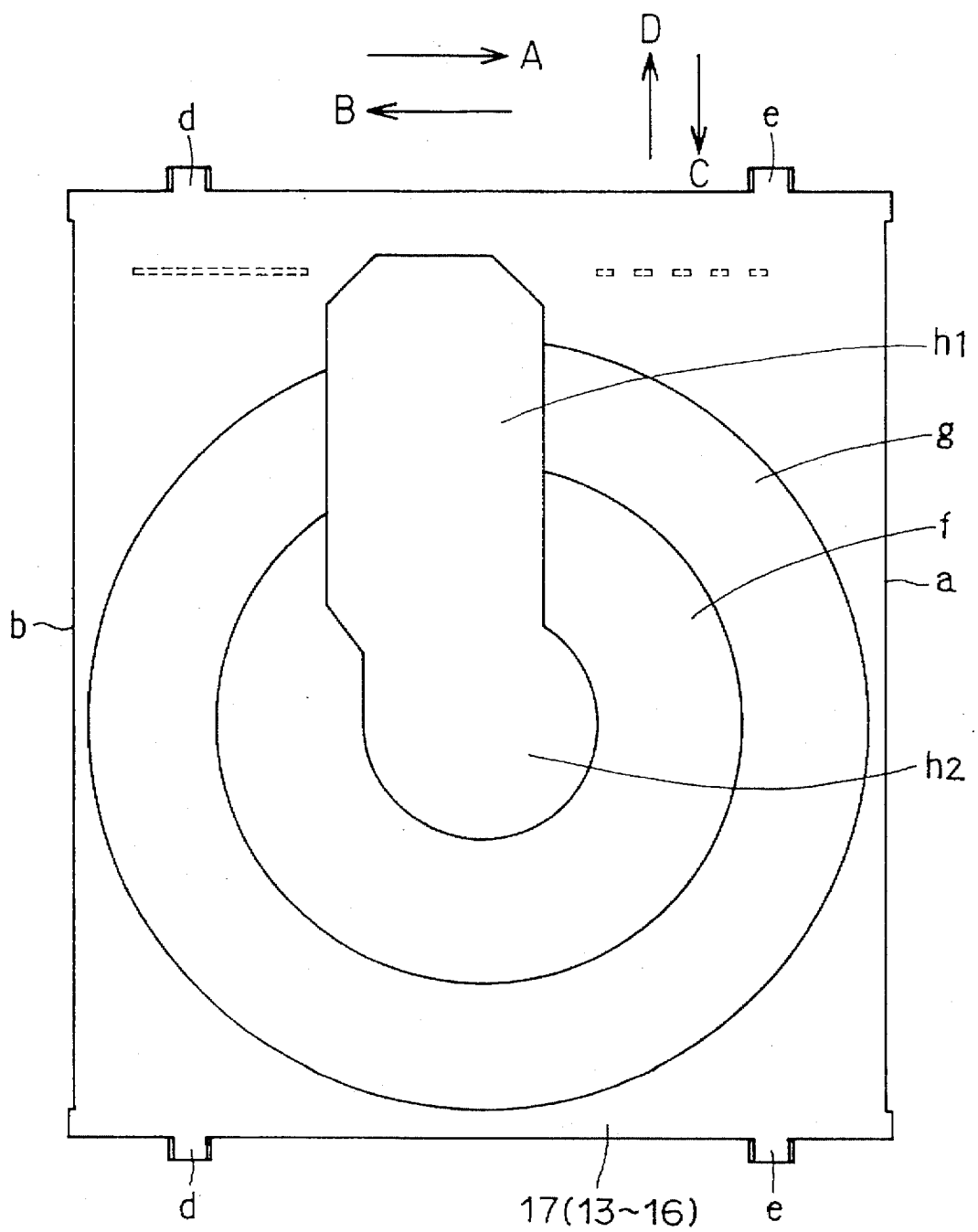
FIG. 4 is a front view of the disc tray shown in FIG. 3.
Figure 5:
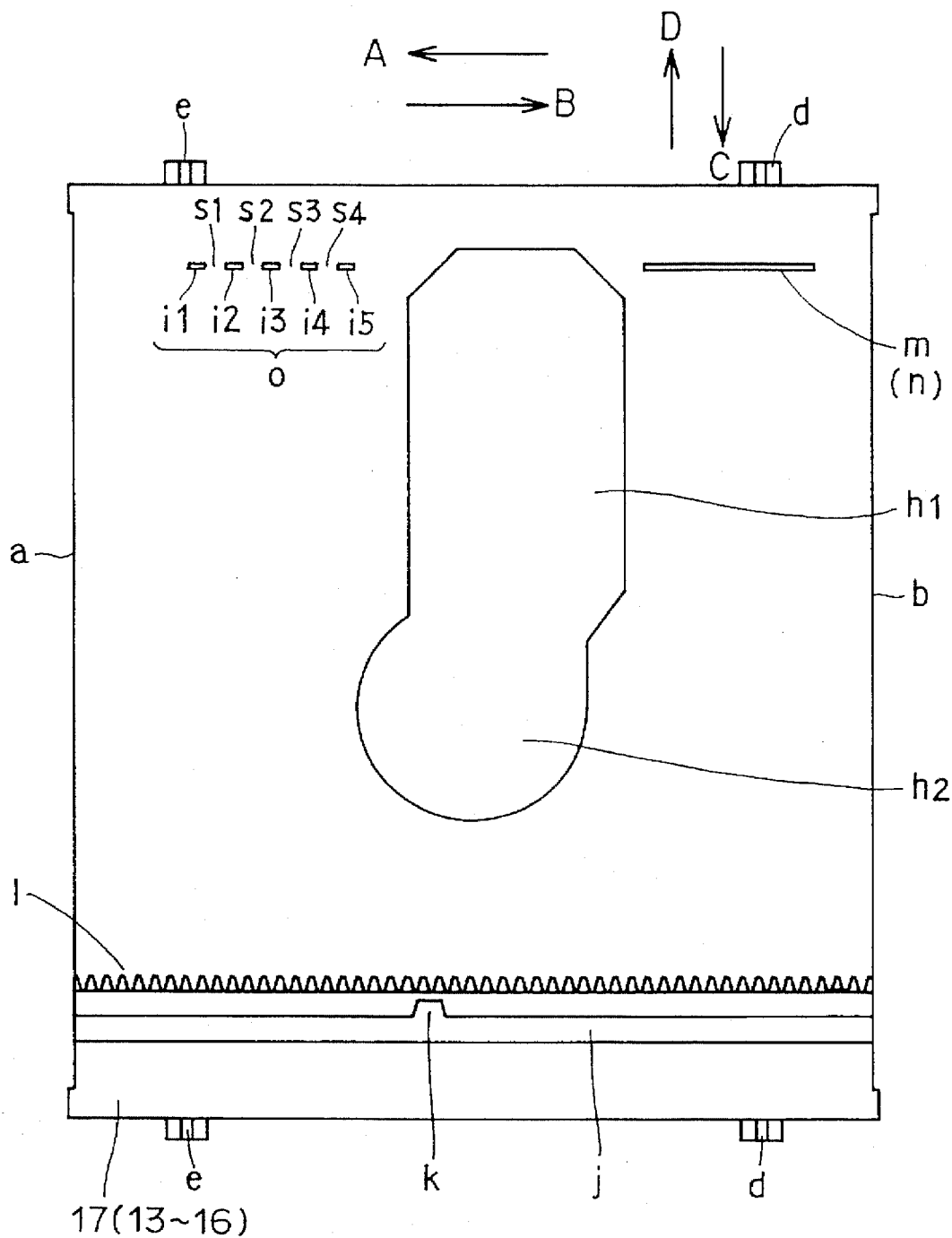
FIG. 5 is a rear view of the disc tray shown in FIG. 3.

Now, referring to FIGS. 4 and 5, each disc tray 13–17 is provided with a recess f for mounting an 8 cm CD (Compact Disc) and a recess g for mounting a 12 cm CD. Also provided in each disc tray 13–17 are a relief hole h1 for facing pick-up 10 of reproducing unit 8 to the CD, and a relief hole h2 for turn table 9 of reproducing unit 8.

With reference to FIG. 5, projections i1, i2, i3, i4, and i5 which form a disc number detecting mark o are provided on a back face of each disc tray 13–17 with intervals between slits s1, s2, s3, and s4 along a straight line in the same direction as disc tray transfer. The number of these projections i1–i5 formed is the same as the disc number. Therefore, as to disc numbers of disc trays 13–17 (see FIG. 3), No. 1 through No. 5 discs are respectively designated by disc tray 13 through disc tray 17. This means that disc tray 13 (No. 1) has one projection, disc tray 14 (No. 2) has two projections, disc tray 15 (No. 3) has three projections, disc tray 16 (No. 4) has four projections, and disc tray 17 (No. 5) has five projections.

These projections i1–i5 are formed to have approximately the same width of, for example, 3 mm. Also, slits s1–s4 are formed to have the same width of, for example, 3 mm. The left end of first projection i1 is located at a position distanced from the left end of disc trays 13–17 by an approximately constant distance of, for example, 18 mm (see FIG. 5).

A stop position detecting mark consisting of a projection m or n is formed spaced by a predetermined distance from disc number detecting mark o consisting of projections i1–i5. Projections i1–i5 serving as the disc number detecting mark and projection m, n serving as the stop position detecting mark are provided on the same line along a direction of transferring disc trays 13–17 (direction A or B). Projection m or n forming the stop position detecting mark is provided formed having a width larger than respective width of projections i1–i5 forming disc number detecting mark o. More specifically, projection m has a width of 27 mm and projection n has a width of 9 mm. Projection m is provided on respective No. 2–No. 5 disc trays 14–17, while projection n is provided on No. 1 disc tray 13 located at one end of disc tray array 12. As such, projection m is formed to have a width greater than projection n.

A distance between the left starting end of projection m, n of the stop position detecting mark and the left starting end of disc number detecting mark o is mostly identical in each disc tray 13–17. In this embodiment, the distance is set to 72 mm (see FIG. 5).

Figure 6:
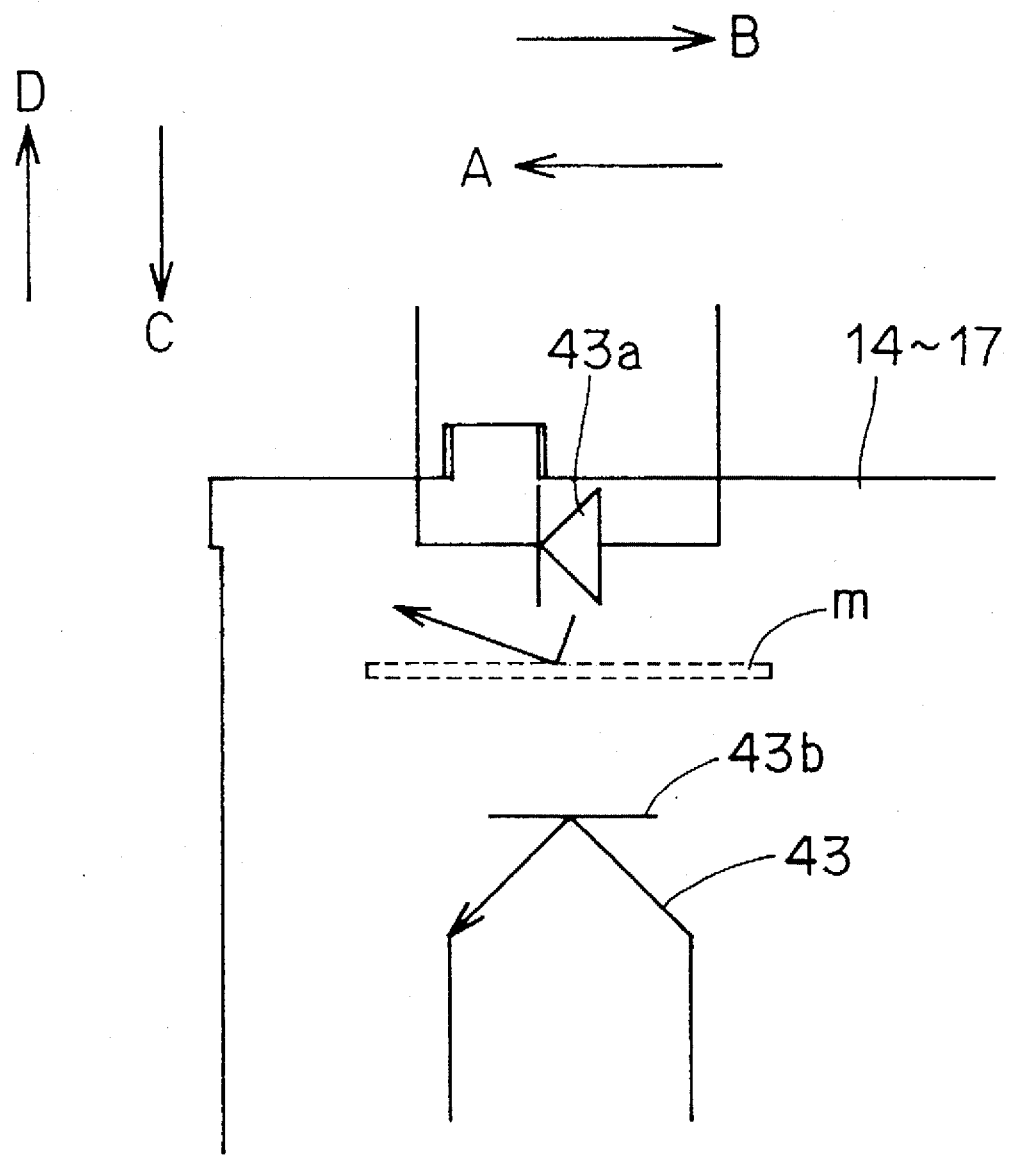
FIG. 6 is a layout showing a positional relationship between a projection m of a stop position detecting mark and a photosensor of the disc reproducing apparatus according to the present invention.
Figure 7:
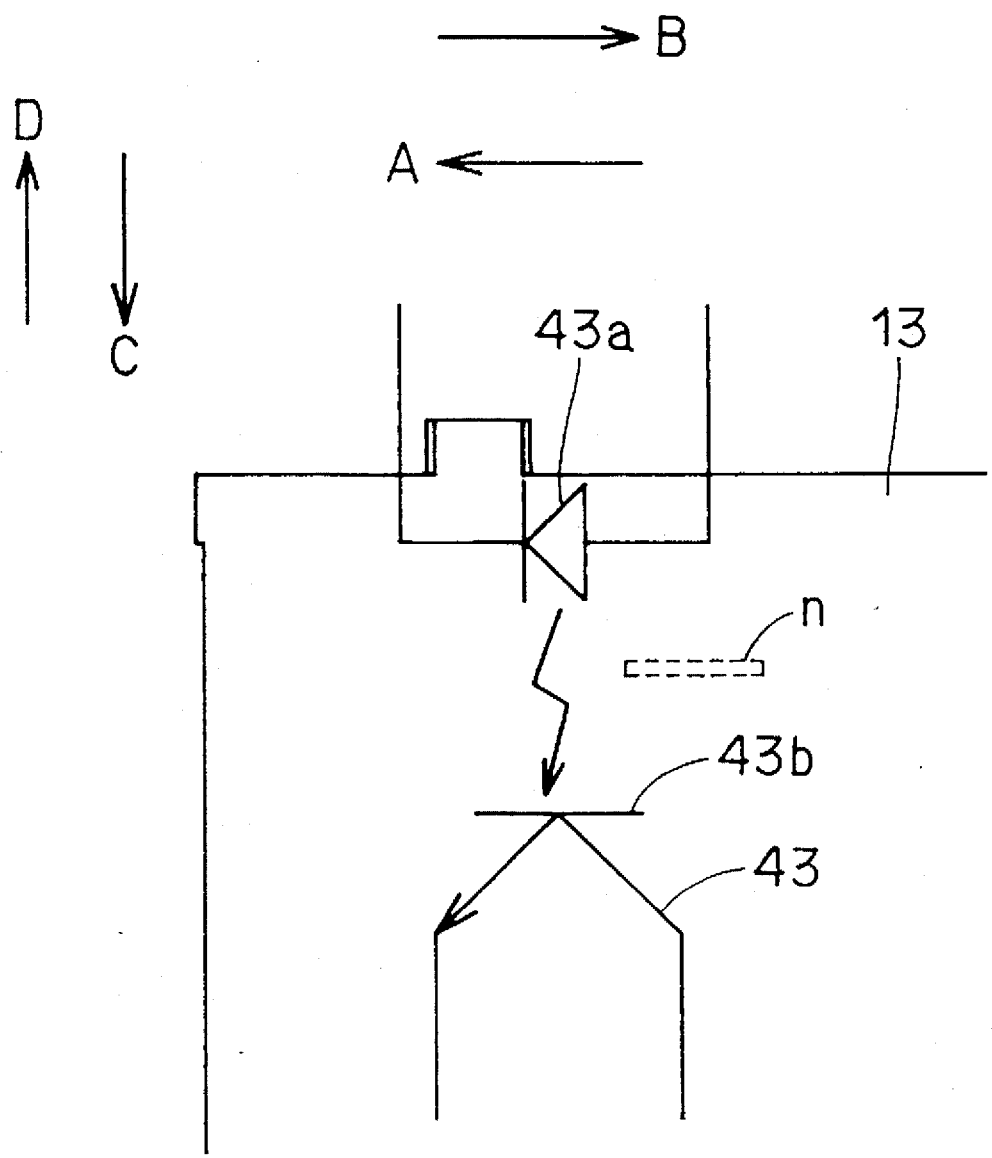
FIG. 7 is a layout showing a positional relationship between a projection n of a stop position detecting mark and a photosensor of the disc reproducing apparatus according to the present invention.

Now, referring to FIGS. 6 and 7, a photosensor 43 consisting of a sensor light source 43a and a sensor light receiving portion 43b is provided in main body 1 of the apparatus (see FIG. 1). Photosensor 43 is disposed in such a position that projection m or n serving as the stop position detecting mark can pass through between sensor light source 43a and sensor light receiving portion 43b. Accordingly, disc number detecting mark o provided on the same line as projection m (or n) serving as the stop position detecting mark can also pass through between sensor light source 43a and sensor light receiving portion 43b. In such a structure, both disc number detecting mark o and the stop position detecting mark can be detected by one photosensor 43, thereby simplifying the structure of the apparatus.

As can be seen from FIG. 6, at the stop position of disc trays 14–17 having stop position detecting mark projection m, projection m is in such a position as to interrupt light directed from sensor light source 43a to sensor light receiving portion 43b. In this event, photosensor 43 is in a ON state. It is assumed that a state in which photosensor 43 detects projection m or n is referred as a ON state, and a state in which photosensor 43 does not detect projection m or n is referred as an OFF state. This is only a matter of circuit structure, so that no problem will occur if these states are referred reversely.

As can be seen from FIG. 7, when No. 1 disc tray 13 is in a stop position, stop position detecting mark projection n stops in such a position as not to interrupt light directed from sensor light source 43a to sensor light receiving portion 43b. Specifically, photosensor 43 is located to the left of projection n. In this event, photosensor 43 is in the OFF state.

Figure 8:
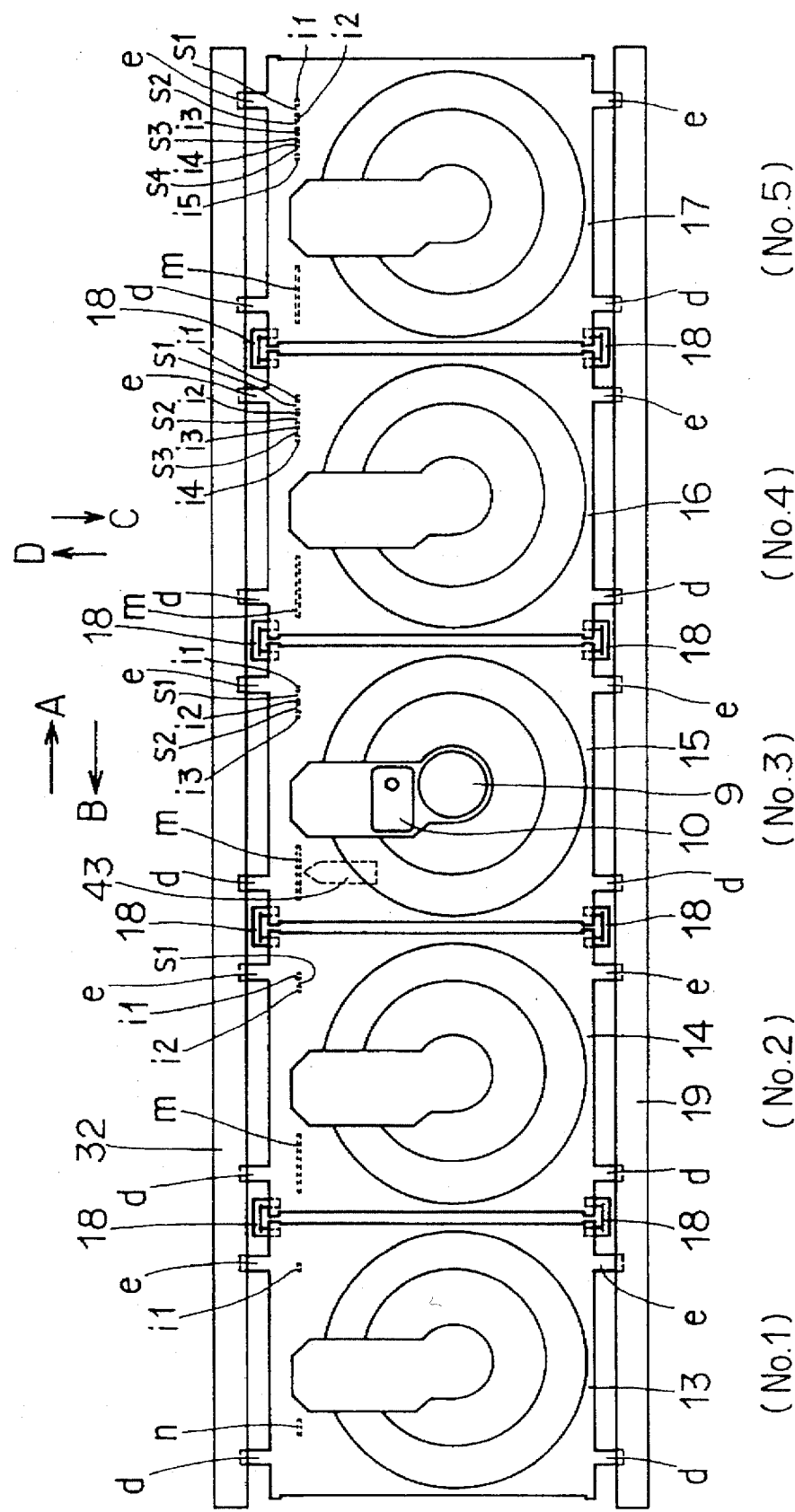
FIG. 8 is a layout showing positions of projections m, n for detecting a stop position and a disc number detecting mark o of disc trays 13–17 shown in FIG. 3.

In the conceptual view of FIG. 8, it is assumed that all disc trays 13–17 are provided in one plane surface by ignoring tray storing portions 3 and 4 described above. With reference to FIG. 8, No. 3 disc tray 15 is held in the reproducing position. At this time, if an operator selects No. 5 disc tray 17, photosensor 43 detects the status as follows.

(1) Projection m of No. 3 disc tray 15 is detected by photosensor 43. Then, photosensor 43 enters a no detection state.

(2) Projection i3 of No. 3 disc tray 15 is detected, whereby a value in a counter becomes 1.

(3) Slit s2 of No. 3 disc tray 15 passes by photosensor 43. At this time, photosensor 43 is in the no detection state (the OFF state).

(4) Then, projection i2 of No. 3 disc tray 15 is detected by photosensor 43. Comparison is made between the detection time and a predetermined first preset time, and if the detection time is shorter than the preset time, then, a value in the counter becomes 2.

(5) Slit s1 of No. 3 disc tray 15 passes by photosensor 43. At this time, photosensor 43 is in the no detection state (the OFF state).

(6) Projection i1 of No. 3 disc tray 15 is detected by photosensor 43. Comparison is made between the detection time and the predetermined first preset time, and if the detection time is shorter than the first preset time, then a value in the counter becomes 3.

(7) Projection m of No. 4 disc tray 16 is detected by photosensor 43. If a no detection time before detecting projection m is longer than a predetermined second preset time, and if the detection time of projection m is longer than the predetermined first preset time, then the value in the counter is reset to 0. Thereafter, photosensor 43 enters the no detection state (the OFF state).

(8) Projection i4 of No. 4 disc tray 16 is detected by photosensor 43, whereby the value in the counter becomes 1.

(9) Slit s3 of No. 4 disc tray passes by photosensor 43. Photosensor 43 is in the no detection state (the OFF state). Thereafter, the similar operation is repeated until photosensor 43 detects projection i1 of No. 4 disc tray 16. In the event that photosensor 43 detects projection i1, the value in the counter is 4.

(10) Photosensor 43 then enters the no detection state (the OFF state). Then, projection m of No. 5 disc tray 17 is detected by photosensor 43, when the value in the counter is reset to 0 again.

As described above, disc number detecting mark o and the stop position detecting mark are successively detected by photosensor 43. It is noted that the counter and the memory will be described later.

Disc number detecting marks i1–i5 of No. 5 disc tray 17 are unnecessary as long as the operation is carried out normally; however, these marks i1–i5 are provided in case for detecting malfunction of disc tray array 12 or for preparation in an attempt to increase the number of trays in disc tray array 12.

Unlike the above, if the operator selects No. 1 disc tray 13, then photosensor 43 detects the status as follows.

(1) Detect No. 3 projection m. Then, enter the no detection state.

(2) Detect No. 2 projection i1. Set 1 in the counter.

(3) s1 of No. 2 (the no detection state).

(4) Detect i2 of No. 2. Set 2 in the counter under a predetermined condition. Then, enter the no detection state.

(5) Detect m of No. 2. Reset the counter under the predetermined condition. Then, enter the no detection state.

(6) Detect No. 1 projection i1. Set 1 in the counter. Then, enter the no detection state.

(7) Detect No. 1 projection n. Reset the counter under the predetermined condition. Then, enter the no detection state.

It is noted that a rack is also provided extending in a direction of transferring disc trays (a direction of arrow A or B) in the back face of each disc tray 13–17. Rack 1 engages with a transfer gear 37b described below in a direction of arrow C. Further, a groove j is provided in parallel with and spaced by a predetermined distance from rack 1 in a direction of arrow C. A lock lever 39 described below is fitted into groove j. A recess k is provided in approximately the center of groove j. By fitting lock lever 39 into this recess k, disc trays 13–17 are disabled from moving in a direction of arrow A or B. Disc trays 13–17 are thereby held in position.

Now, the disc tray transfer means and the elevating and lowering means of the reproducing unit will be described in detail below.

Figure 9:
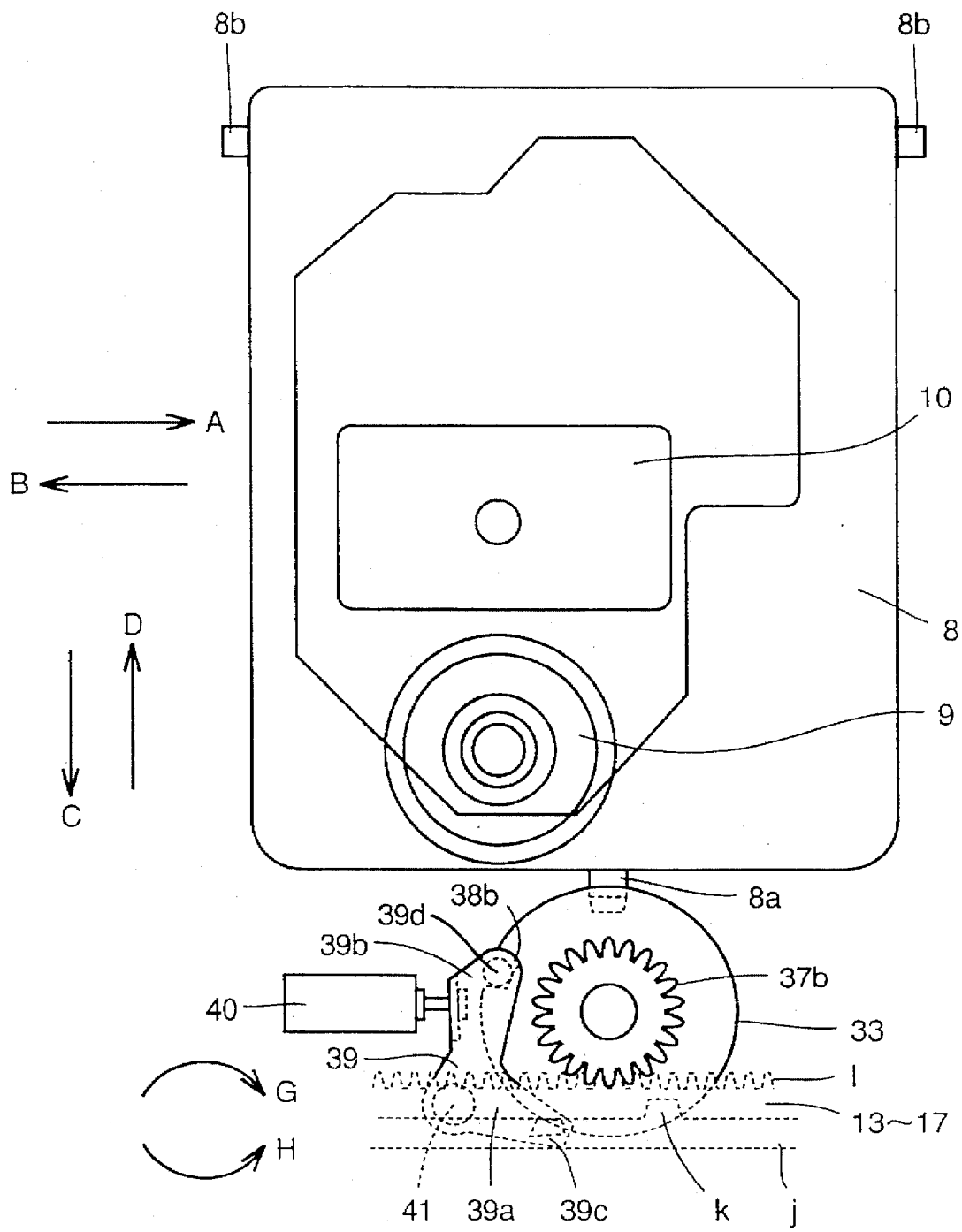
FIG. 9 is a plan view showing a disc tray transfer means and an elevating and lowering means of a reproducing portion of the disc reproducing apparatus shown in FIG. 3.
Figure 10:
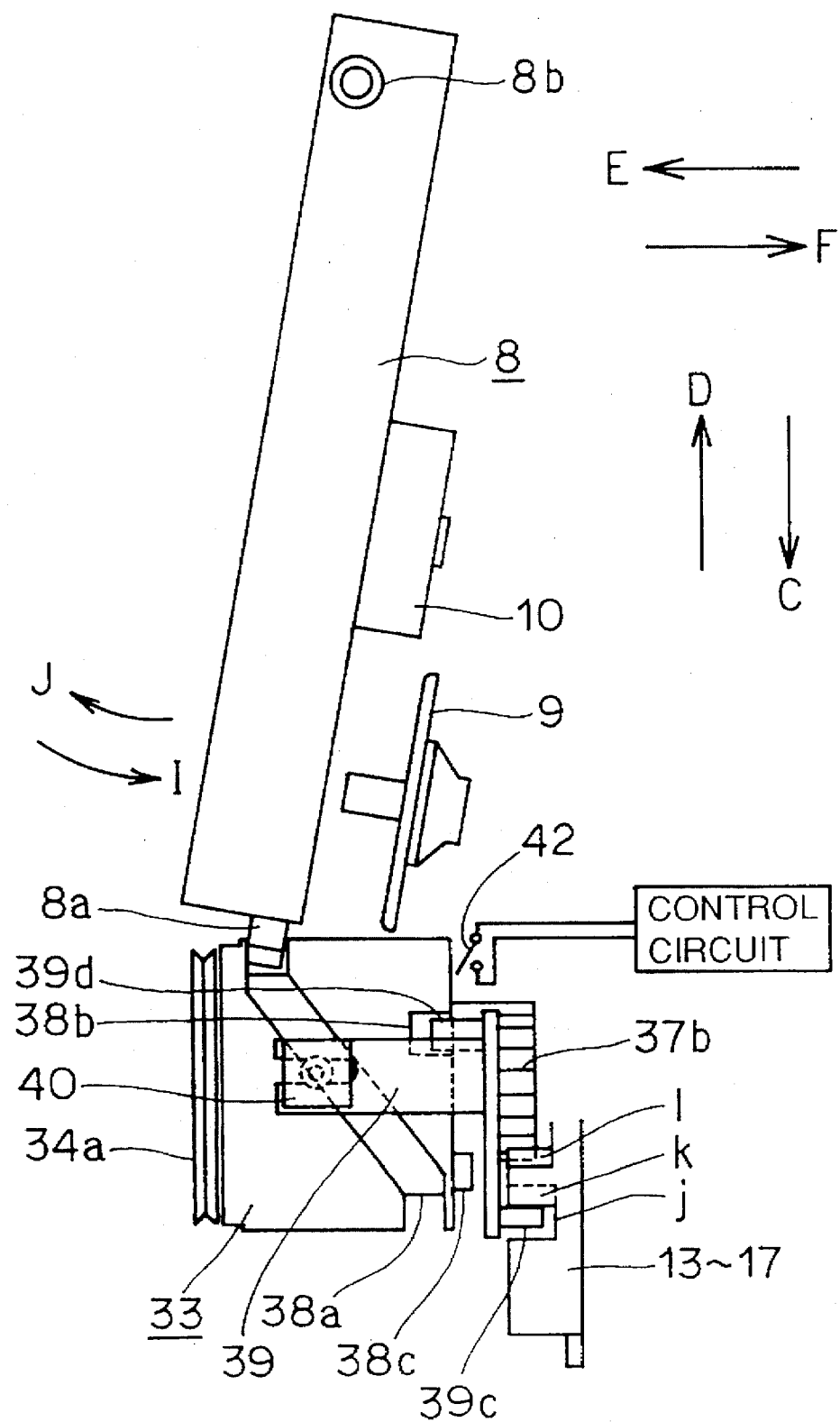
FIG. 10 is a side view showing the disc tray transfer means and the elevating and lowering means of the reproducing portion of the disc reproducing apparatus shown in FIG. 3 when seen from the left side.

With reference to FIGS. 9 and 10, reproducing unit 8 is provided with pick-up 10 and turn table 9. Also, reproducing unit 8 is provided with a projection 8a at an edge in the direction of arrow c. Projection 8a is fitted in a cam trench 38a of cam rotating unit 33. Reproducing unit 8 is rotatably supported in the directions designated by arrows I and J around a rotational axis 8b of the reproducing unit. Rotation of reproducing unit 8 in the direction of arrow I is referred to as elevating and rotation of reproducing unit 8 in the direction of arrow J is referred to as lowering. Lock lever 39 and a solenoid 40 will be described later in detail.

Figure 11:
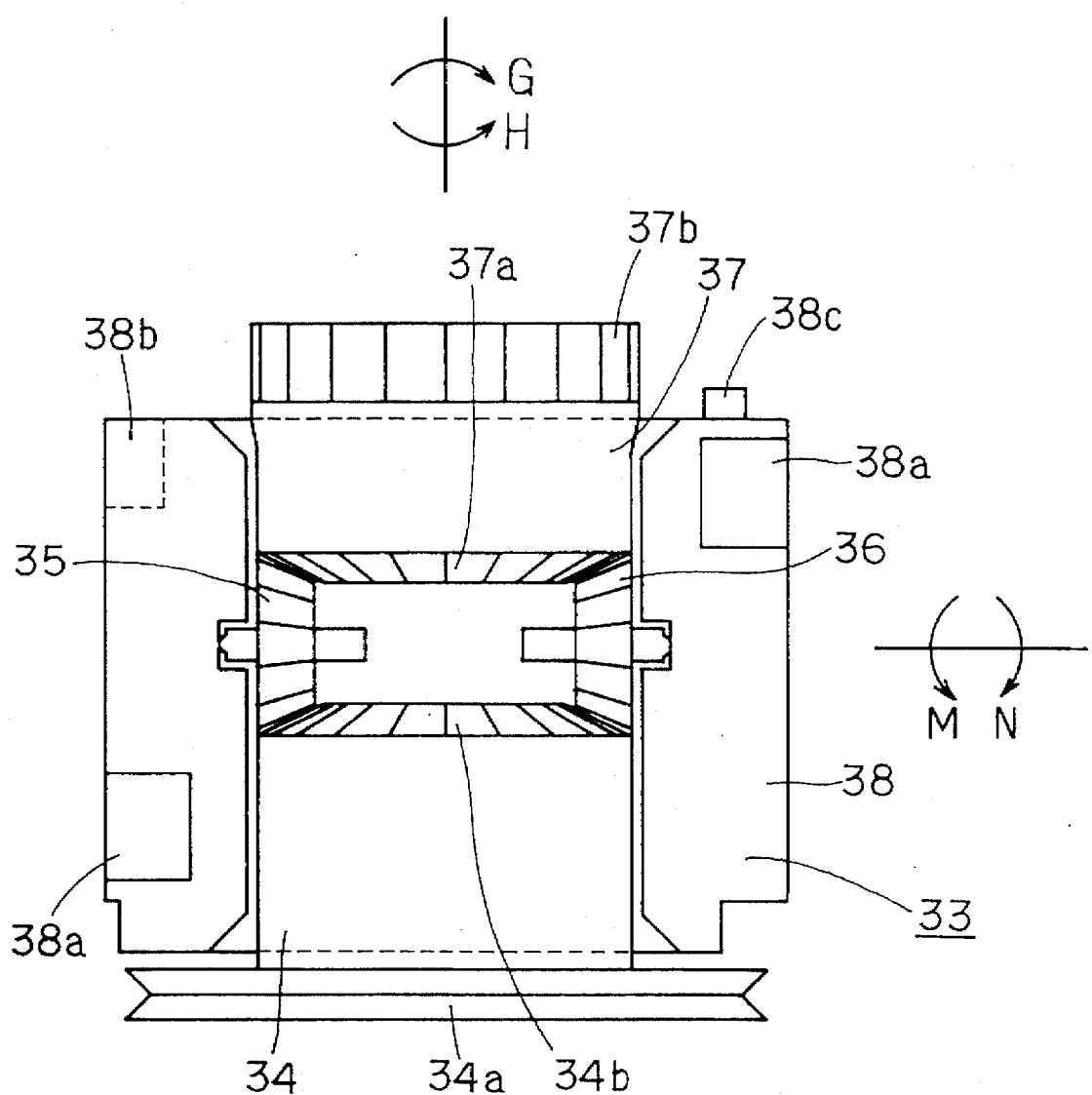
FIG. 11 is a cross sectional view showing the structure of a cam rotating unit shown in FIGS. 9 and 10.

With reference to FIGS. 9–11, cam rotating unit 33 is provided with a drive gear 34 which can turn in the directions of arrows G and H around a supporting axis (not shown) extending in the directions of arrows E and F. Drive gear 34 includes a pulley 34a provided in the direction of arrow E and a first helical gear 34b provided to the direction of arrow F. Pulley 34a can be rotated in both directions by a motor (not shown). First helical gear 34b is engaged by two second helical gears 35 and 36.

Second helical gears 35 and 36 is pivotably supported by cam rotating unit 38. More specifically, second helical gears 35 and 36 are engaged by cam rotating unit 38 so that cam rotating unit 38 rotates integrally with gears 35 and 36 when gears 35 and 36 revolve in the directions of arrows G and H. Also, cam rotating unit 33 is provided with a tray driving gear 37. A third helical gear 37a which comes to an engagement with second helical gears 35 and 36 is provided in tray driving gear 37 toward the direction of arrow E. Further, a spur gear 37b which comes to an engagement with rack 1 provided in each disc trays 13–17 is provided in tray driving gear 37 toward the direction of arrow F.

As can been seen from FIG. 10, cam trench 38a for elevating/lowering reproducing unit 8 is provided on the side of cam rotating unit 38. Also, a recess 38b for holding lock lever 39 in position is provided at an edge of cam rotating unit 38 in the direction of arrow F. A projection 38c is provided on the side of cam rotating unit 38 in the direction of arrow F. In the meanwhile, a switch 42 is provided at such a position such that the switch is turned on by projection 38c when reproducing unit 8 is moved to the furthest side in the direction of arrow F by cam rotating unit 38. Switch 42 serves to detect when reproducing unit 8 reaches a reproducible position.

As will be described later, the disc tray has always completed its transfer to the reproducing position whenever reproducing unit 8 is elevated, such that switch 42 serves as a switch for detecting completion of transfer of the disc tray (i.e. a tray position detecting sensor) as well as a switch for detecting completion of elevation of the reproducing unit.

Now, an operation of cam rotating unit 33 structured as above will be described below.

An operation of the disc tray transfer mechanism will be described first. With reference to FIGS. 9–11, pulley 34a is firstly driven and rotated. If rotation of cam rotating unit 38 in the direction of arrow G or H is prevented, then second helical gears 35 and 36 cannot turn in that direction. Accordingly, second helical gears 35 and 36 rotate in the direction of arrow M or N by rotation of first helical gear 34b in the direction of arrow G or H. This rotation of second helical gears 35 and 36 cause third helical gear 37a to turn in the direction of arrow G or H.

Upon rotation of third helical gear 37a, spur gear 37b starts rotation. Since spur gear 37b is in engagement with rack 1 of disc tray 13–17, disc tray 13–17 transfers in the direction of arrow A or B. More specifically, disc tray 13–17 moves in the direction of arrow A or B in response to the rotating direction of the motor (not shown) serving as the driving source of pulley 34a. Disc tray 13–17 is thus transferred.

Next, elevating/lowering operations of reproducing unit 8 will be described. With reference to FIGS. 9–11, pulley 34a is firstly driven and rotated by the motor (not shown). If rotation of tray driving gear 37 in the direction of arrow G or H is prevented, then second helical gears 35 and 36 cannot rotate in the direction of arrow M or L. Accordingly, second helical gears 35 and 36 rotates in the direction of arrow G or H by rotation of first helical gear 34b in the direction of arrow G or H. This rotation of second helical gears 35 and 36 causes cam rotating unit 38 to turn in the direction of arrow G or H. By rotation of cam rotating unit 38, reproducing unit 8 is elevated or lowered. The elevating/lowering movement of reproducing unit 8 is carried out corresponding to the rotating direction of the motor (not shown) which drives pulley 34a.

In the disc reproducing apparatus of this embodiment, reproducing unit 8 can be elevated or lowered only by preventing rotation of tray driving gear 37 serving as the driving source of the disc transfer mechanism. Also, the disc tray transfer mechanism can be driven only by preventing rotation of cam rotating unit 38 serving as the driving source of the elevating/lowering movement of reproducing unit 8. This function is the same as an interlock circuit which is one type of electric circuits. Thus, this mechanism is significant in the electric circuit corresponding to a disc changer which will be described later.

Now, referring to FIGS. 9 and 10, a structure of lock lever 39 will be described in detail. Lock lever 39 is in the shape of "<" and having first and second arms 39a and 39b. Lock lever 39 is provided rotatably around an supporting axis 41. Provided at a tip end of first arm 39a is a projection 39c which is fixed in groove j provided in each disc tracy 13–17 and which can be in and out of recess k provided in groove j. Provided at a tip end of second arm 39b is a projection 39d which can be in and out of recess 38b provided in cam rotating unit 38.

Further, lock lever 39 is pulled toward the direction of rotation designated by arrow G by means of a spring which is not shown. Then, lock lever 39 is rotated in the direction of arrow H as solenoid 40 is driven.

When placed in the reproducing position, disc tray 13–17 is held in position so as not be moved in the direction of arrow A or B, because projection 39c of lock lever 39 is in engagement with recess k of groove j. In this state, projection 8a of reproducing unit 8 is located in the farthest position of come trench 38a toward the direction of arrow F. In other words, reproducing unit 8 is in the reproducible position.

At this time, projection 39d of second arm 39b is not in engagement with recess 38b of cam rotating unit 38, instead projection 39d is located on the outer side face around the periphery of cam rotating unit 38. Accordingly, even if lock lever 39 is being pulled by the spring in the direction of arrow G, projection 39c will not go out of recess k.

Now, operations of the disc tray transfer mechanism and the elevating/lowering mechanism of the reproducing unit in the case when another disc tray is transferred to the reproducing position from the condition above will be described below.

First, the motor which is not shown is rotated in a predetermined direction corresponding to a traveling direction of disc tray array 13–17, thereby turning drive gear 34. As projection 39c of lock lever 39 is fitted in recess k in this state, the disc tray cannot move in the direction of arrow A or B. Thus, rotation of tray driving gear 37 is prevented by such a mechanism.

Accordingly, only cam rotating unit 38 turns by about 180°. Reproducing unit 8 is then lowered in the direction of arrow E to reach a no reproducing position. As cam rotating unit 38 turns, projection 39d of lock lever 39 is fitted into recess 38d of come rotating unit 38. This releases rotation of lock lever 39 in the direction of arrow G, so that lock lever 39 starts rotating in the direction of arrow G. As a result, projection 39c comes out of recess k of the disc tray. Accordingly, projection 39c enters groove j, whereby the disc tray is movable in the directions of arrows A and B and prohibition of rotation of tray driving gear 37 is released.

At the same time, rotation of cam rotating unit 38 is prevented, since projection 39d is fitted into recess 38b of cam rotating unit 38. Reproducing unit 8 is thus held in the no reproducing position. This is a mechanism for prohibiting rotation of cam rotating unit 38.

In this state, the disc tray is moved in the directions of arrows A and B through spur gear 37b and rack 1 due to rotation of tray driving gear 37.

Solenoid 40 is driven right before a desired disc tray is moved closer to the producing position, whereby lock lever 39 tends to rotate in the direction of arrow H against a tension force toward the direction of arrow G generated by the spring. However, lock lever 39 cannot rotate in the direction of arrow H because projection 39c of lock lever 39 abuts against the wall of disc tray groove j.

When projection 39c reaches the position of recess k and is fitted into recess k, the desired disc tray can be held in the reproducing position. By fitting projection 39c into recess k, rotation of tray driving gear 37 is prevented, so that no force is exerted to move the disc tray. The operation of the disc transfer mechanism is thus stopped.

At the same time, upon stopping rotation of tray driving gear 37, cam rotating unit 38 starts to rotate. More particularly, projection 39d of lock lever 39 comes out of recess 38b of cam rotating unit 38 when projection 39c of lock lever 39 is fitted into recess k. Prevention of rotation of the cam rotating unit is thus released, whereby cam rotating unit 38 starts to rotate. In other words, the operation of the elevating/lowering mechanism of the reproducing unit is started.

When reproducing unit 8 reaches the reproducing position, switch 42 is turned on. Accordingly, driving of the motor is stopped, such that the operation of the elevating/lowering mechanism of the reproducing portion is stopped.

An important point in the disc tray transfer operation described above is that solenoid 40 is operated before the disc tray reaches the predetermined reproducing position. This eliminates the need for strictly controlling the operational timing of solenoid 40 as well as sufficiently increasing the transfer speed of the disc tray. Such a structure has already been implemented in the conventional roulette type disc changer. However, in the conventional roulette type disc changer, the solenoid is provided only to serve as a means for holding the disc tray in a predetermined position. On the contrary, solenoid 40 of this embodiment serves to stop the disc tray in a predetermined position thereby holding the disc tray in position, and right after that to quickly start the elevating/lowering operation of the reproducing unit. Thus, this embodiment can achieve such an effect that cannot be obtained by using the solenoid of the conventional roulette type disc changer.

Figure 12:
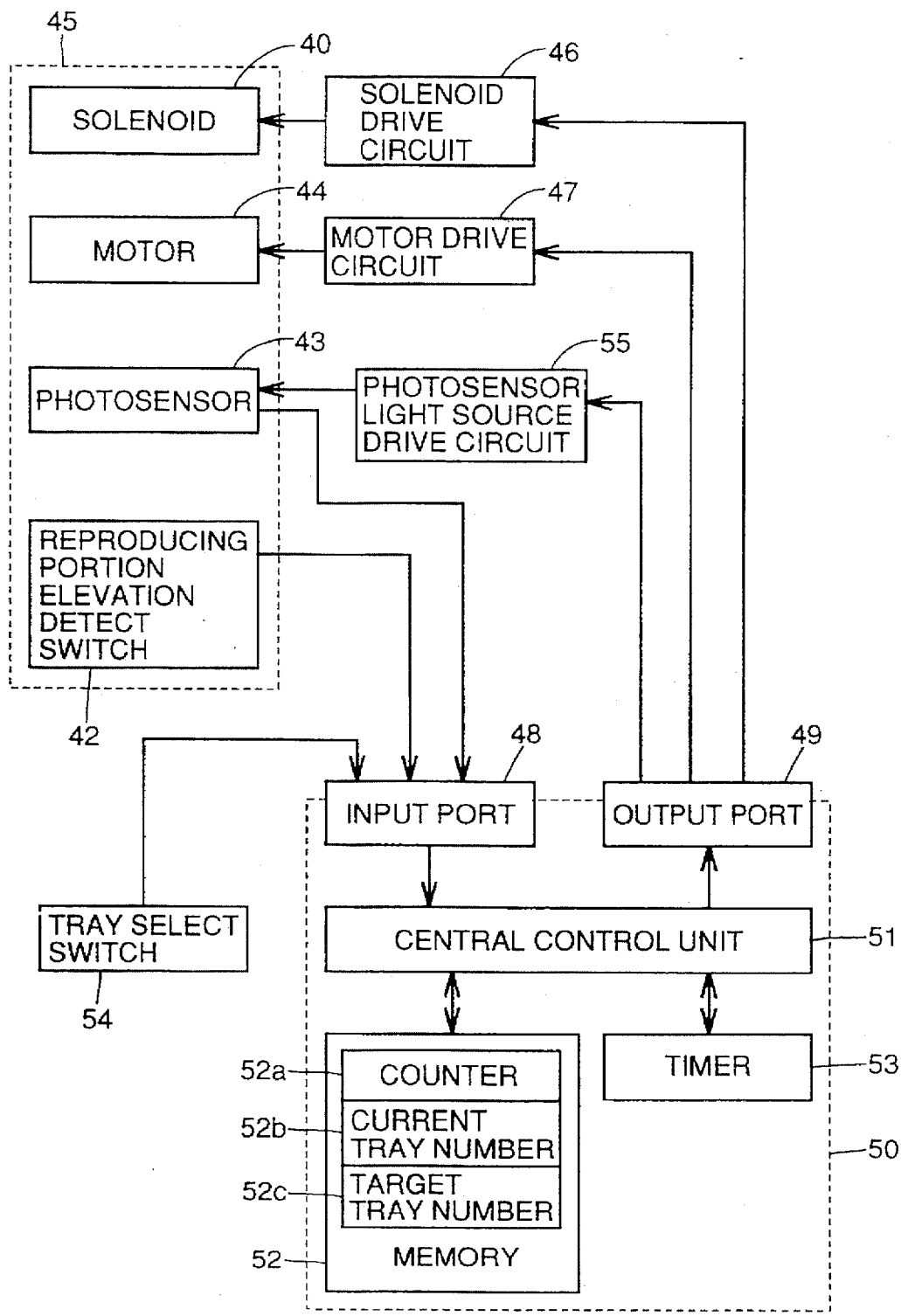
FIG. 12 is a block diagram showing a control means of the disc reproducing apparatus according to one embodiment of the present invention.

With reference to FIGS. 12, a mechanism control unit 45 of this embodiment includes a solenoid 40, a motor 44, a photosensor 43, and a switch 42 for detecting elevation of the reproducing unit. A control circuit 50 includes a central controlling unit 51, a memory 52, a timer 53, and input and output ports 48 and 49.

A signal detected by photosensor 43 is applied to input port 48 in control circuit 50. A signal detected by switch 42 for detecting elevation of the reproducing unit is also applied to input port 48 of control circuit 50. Upon receiving signals from photosensor 43 and switch 42, input port 48 sends its content to central controlling unit 51.

A control output from central controlling unit 51 is applied to output port 49. If output port 49 outputs a signal for controlling motor 44, then the output signal is supplied to motor driving circuit 47. Depending on a type of the signal, motor controlling circuit 47 supplies such a voltage to motor 44 that drives motor 44 forward or backward, or that disconnects or stops motor 44.

In the meanwhile, if the output supplied from central controlling unit 51 to output port 49 is a signal for controlling solenoid 40, then the output signal is supplied to solenoid driving circuit 46. Solenoid 40 is sucked or the suction is released depending on the type of the signal supplied to solenoid driving circuit 46.

Memory 52 provided within control circuit 50 is a memory device which has capabilities of reading, writing and erasing, and more specifically, memory 52 is a RAM (Random Access memory). Memory 52 is connected to central controlling unit 51, so that data can be read, written, erased, if necessary, depending on an instruction supplied from central controlling unit 51. To part of addresses of memory 52 are allotted a counter 52a, a current tray number 52b, and a target tray number 52c.

Counter 52a is used for temporarily storing the number of signals detected by photosensor 43. Current tray number 52b is used for storing the disc tray number which is currently in the reproducing position. Target tray number 52c is used for storing the disc number of the disc tray which is a desired disc tray selected by a user. A timer 53 serving as a time counting device is also provided in control circuit 50. Timer 53 sets a specified time or reads out a time elapse in response to an instruction supplied from central controlling unit 51.

A tray select switch 54 is a switch group used as an input means for selecting a disc tray of a desired disc number out of disc tray array 12. A select signal of the disc tray selected by tray select switch 54 is applied to central controlling unit 51 via input port 48. It is noted that tray select switch 54 can be a switch which corresponds each disc number of disc trays 13–17, or can be implemented by two switches for feeding the disc tray to the right (the direction of A) or to the left (the direction of B). In the description of this embodiment, it is assumed that the switches corresponding to each disc number of the disc trays are provided.

FIGS. 13–19 are flow charts in the event that the disc reproducing apparatus of this embodiment is set under such conditions as are described below.

(1) An interval between projections i1–i5 serving as disc number detecting mark o provided in disc trays 13–17 is 3 mm.

(2) A width of slit s1–s4 provided between projections i1–i5 serving as disc number detecting mark o provided in disc trays 13–17 is 3 mm.

(3) A distance from the left end of projection i1 serving as disc number detecting mark o provided in disc tray 13–17 and the left end of disc tray is about 18 mm (see FIG. 5).

(4) A width of projection m serving as the stop position detecting mark provided in each disc tray 14–17 is 27 mm.

(5) A width of projection n serving as the stop position detecting mark provided in disc tray 13 is 9 mm.

(6) A distance from the left end of projection i1 serving as disc number detecting mark o provided in disc tray 13–17 and the left end of projection m, n serving as the stop position detecting mark is about 72 mm (see FIG. 5).

(7) The time required to transfer a disc tray, which is placed adjacent in the direction of arrow A or B to the disc tray which is in the current reproducing position, to the reproducing position and to stop the disc tray in position is about 1.8 seconds.

(8) Within the above time (about 1.8 seconds), the time required to transfer the disc tray to the adjacent disc tray either in the direction of arrow A or B is about 1 second.

(9) The time required to elevate/lower the reproducing unit is respectively about 0.4 second.

From the above, the time required for projections i1–i5 serving as disc number detecting mark o, slits s1–s4, and projection m, n serving as the stop position detecting mark, which are provided in disc trays 13–17, to pass by photosensor 43 can be calculated as follows.

(1) It takes about 23.4 milliseconds before each projection i1–i5 passes by photosensor 43.

(2) It takes about 23.4 milliseconds before each slit s1–s4 passes by photosensor 43.

(3) It takes 21.1 milliseconds before projection m passes by photosensor 43, and it takes about 70.3 milliseconds before projection n passes by photosensor 43.

(4) It takes about 562.6 milliseconds before a region between the left end of projection i1 of disc number detecting mark o and the left end of projection m, n of the stop position detecting mark passes by photosensor 43.

Premising the above, contents of operations in respective steps of the flow charts will be described below.

In step 101, a power supply of the disc reproducing apparatus is turned on. Upon power-on in step 101, a light source turn-on signal is supplied from central controlling unit 51 to a photosensor light source driving circuit 55 via output port 49. Upon reception of the light source turn-on signal, photosensor light source driving circuit 55 applies a voltage to an LED (Light Emitting Diode) serving as a light source 43a of photosensor 43, thereby turning on the LED. Thus, photosensor 43 can detect the presence of projections of respective marks.

In step 103, a time period of 5 seconds is set in timer 53 in response to an instruction from central controlling unit 51. Timer 53 set as such serves like a watchdog timer to supervise whether or not a predetermined job is completed within the set period. If the predetermined job is not completed within the time, then a predetermined processing is carried out. A detailed operation of timer 53 as well as the predetermined processing in the event that the predetermined job is not completed will be described later.

In step 104, whether or not switch 42 for detecting elevation of the reproducing unit is currently in the on state is confirmed based on the voltage applied to central controlling unit 51 from switch 42 via input port 41, switch 42 being intended to be turned on when reproducing unit 8 elevates to the reproducing position. Subsequently, the control proceeds to step 106 if the on state is detected, while the control proceeds to step 111 which will be described later if the off state is detected.

In step 106, whether or not projections of respective marks are detected by sensor light receiving portion 43b of photosensor 43 is confirmed based on the voltage applied to central controlling unit 51 from photosensor 43 via input port 48. If the projection is detected, the control proceeds to step 152 which will be described later, while the control proceeds to the next step 107 if no projection is detected.

In step 107, the current disc tray number assigned to a part of addresses of memory 52 is set to 1.

In step 109, a light source turn-off signal is applied to photosensor light source driving circuit 55 from central controlling unit 51 via output port 49. Upon reception of the signal, photosensor light source driving circuit 55 turns off the voltage applied to the LED serving as sensor light source 43a of photosensor 43, thereby turning off the LED. Thus, photosensor 43 cannot detect the presence of projections of respective marks.

In step 110, the operation of the disc reproducing apparatus is completed, so that the apparatus is stopped. In this state, inputting from tray select switch (disc tray select switch group) 54 a signal which indicates that a disc tray of a desired disc number is selected out of the disc tray array is waited. How the control proceeds in the case when the signal indicating the disc tray of the desired disc number being selected will be described later.

In step 106 described above, if the projections of respective mark is being detected by sensor light receiving portion 43b of photosensor 43, the following operation will be carried out in step 152. More specifically, a reverse signal is applied to motor driving circuit 47 from central controlling unit 51 via input port 49. Upon reception of the reverse signal, motor driving circuit 55 applies a voltage to motor 44 so that motor 44 is rotated reversely. Motor 44 thus starts to rotate in a reverse direction.

In step 154, a time period of 5 seconds is set in timer 53 in response to an instruction from central controlling unit 51. In this case, even if the time period of 5 seconds is already set in timer 53 and counting is done, a time period of 5 seconds is set again in timer 53. In other words, the 5 second timer is restarted.

In step 155, a value in counter 52a which temporarily stores the number of signals detected by photosensor 43 and allotted to a part of addresses of memory 52 is set to 0.

In step 157, whether or not the projections of respective marks are detected by sensor light receiving portion 43b of photosensor 43 is determined based on the voltage applied to central controlling unit 51 from photosensor 43 via input port 48. If the projections are detected, the control waits until no projection is detected, while if the projections are not detected, the control proceeds to step 158.

In step 158, whether or not the projections of each mark are detected by sensor light receiving portion 43b of photosensor 43 is determined in accordance with the signal applied to central controlling unit 51 from photosensor 43 via input port 48. If no projection is detected, the control waits until and projection is detected, while if some projection is detected, the control proceeds to step 160.

In step 160, whether or not the projection of each mark is detected by sensor light receiving portion 43b of photosensor 43 is determined based on the voltage applied to central controlling unit 51 from photosensor 43 via input port 48. If some projection is detected, then the control waits until no projection is detected, while if no projection is detected, the control proceeds to step 162.

In step 162, a time period of 120 milliseconds is set in timer 53 in response to an instruction from central controlling unit 51. Simultaneously, a time out flag of 120 milliseconds is set to 0. Then, counting of time is started in parallel with carrying out the jobs of the subsequent steps. When 120 milliseconds elapses, time out flag of 120 milliseconds is set to 1.

In step 163, the current value in counter 52a for temporarily storing the number of signals detected by photosensor 43 and assigned to the part of addresses of memory 52 is added by 1.

In step 164, a processing for transferring a job into step 165 described below is carried out.

In above step 104, if switch 42 for detecting elevation of the reproducing unit is in the off state, a processing described below is carried out in step 111. More specifically, a reverse signal is supplied to motor driving circuit 47 from central controlling unit 51 via output port 49. Upon reception of the reverse signal, motor driving circuit 55 applies a voltage to motor 44 such that motor 44 rotates in the reverse direction. Motor 44 thus starts to rotate in the reverse direction.

In step 112, a time period of 100 milliseconds is set in timer 53 in response to an instruction from central controlling unit 51, and at the same time, the time out flag of 100 milliseconds is set to 0. Then, counting of time is started in parallel with carrying out the jobs in the subsequent steps. When 100 milliseconds elapses, the time out flag of 100 milliseconds is set to 1.

In steps 113 and 114, whether or not the switch 42 for detecting elevation of the reproducing unit is in the on state is determined based on the voltage applied to central controlling unit 51 from switch 42 via input port 48. Simultaneously, whether or not the time out flag of 100 milliseconds in the 100 millisecond timer set in step 112 is 1 is determined. If switch 42 is in the off state and the time out flag of 100 milliseconds is 0, then the waiting state is entered with continuing supervision. If switch 42 is in the off state and the time out flag of 100 milliseconds is 1, then the control proceeds to step 117. Also, if switch 42 is turned on while the time out flag of 100 milliseconds is 0, then the control proceeds to step 115. In other words, the control watches which of turn-on of switch 42 and the time out flag of 100 milliseconds being 1 is detected first, such that the control proceeds to step 115 if turn-on of switch 42 is detected first, otherwise the control proceeds to step 117.

In step 115, a waiting time of 10 milliseconds is provided with remaining in the current state. More specifically, at the same time as the time period of 10 milliseconds is set in timer 53 in response to the instruction from central controlling unit 51, the time out flag of 10 milliseconds is set to 0. Then, when 10 milliseconds elapses, the time out flag of 10 milliseconds is set to 1. The time out flag of 10 milliseconds is always supervised by central controlling unit 51, so that the control proceeds to 116 when the time out flag of 10 milliseconds is 1.

In step 116, a stop signal is supplied to motor driving circuit 47 from central controlling unit 51 via output port 49. Upon reception of the stop signal, motor driving circuit 47 stops applying the voltage to motor 44, whereby motor 44 stops and the control proceeds to the next step 106.

In steps 113 and 114, the time out flag of 100 milliseconds in the 100 millisecond timer set in step 112 is changed to 1 before switch 42 is turned on, whereby the control proceeds to step 117.

In step 117, the presence of the projection of each mark is detected by sensor light receiving portion 43b of photosensor 43 based on the voltage applied to central controlling unit 51 from photosensor 43 via input port 48. If the projection is detected, the control waits until no projection is detected, while the control proceeds to step 118 if no projection is detected.

In steps 118 and 119, the presence of the projection of each mark is detected by sensor light receiving portion 43b of photosensor 43 based on the voltage applied to central controlling unit 51 from photosensor 43 via input port 48. Simultaneously, whether the 5 second timer set in step 103 counts to 3 seconds is determined in parallel.

If the projection of each mark is not detected by sensor light receiving portion 43b and if the 5 second timer does not reach 3 seconds, then the waiting state is entered with continuing watching. If the projection of each mark is not detected by sensor light receiving portion 43b and if the 5 second timer has reached 3 seconds, then the control proceeds to step 128. In the meanwhile, if the projection of each mark is detected by sensor light receiving portion 43b and if the 5 second timer does not reach 3 seconds, then the control proceeds to step 120. In other words, which of detection of the projection of each mark by sensor light receiving portion 43b and counting of 3 seconds by the 5 second timer comes first is watched, whereby the control proceeds to step 120 if the projection is detected first, otherwise the control proceeds to step 128.

In steps 118 and 119, if detection of the projection of each mark by sensor light receiving portion 43b is earlier than counting of 3 seconds by the 5 second timer, then a time of 120 milliseconds is set in timer 53 in response to the instruction from central controlling unit 51 in step 120, and at the same time, the time out flag of 120 milliseconds is set to 0. Then, time is counted in parallel with carrying out the jobs in the subsequent steps. When 120 milliseconds elapses, the time out flag of 120 milliseconds is set to 1.

In step 121, the presence of the projection of each mark is detected by sensor light receiving portion 43b of photosensor 43 based on the voltage applied to central controlling unit 51 from photosensor 43 via input port 48. If the projection is detected, then the control waits until no projection is detected, while the control proceeds to step 122 if no projection is detected.

In step 122, the time taken until no projection of each mark is detected by sensor light receiving portion 43b of photosensor 43 in step 121 after the 120 millisecond timer is set in step 120 is confirmed. If the counted value of the 120 millisecond timer exceeds 47 milliseconds, then the control proceeds to step 123, otherwise the control returns to steps 118 and 119. The value counted by the 120 millisecond timer is approximately the same as the time taken until no projection is detected in step 121 after the projection is detected by sensor light receiving portion 43b in step 118. This time together with the speed of the projection of each mark passing by sensor light receiving portion 43b can determine a length (a width) of the projection of each mark.

Accordingly, whether or not the projection is of the disc number detecting mark or of the stop position detecting mark is determined in step 122. If the projection is determined to be of the disc number detecting mark, the control proceeds to steps 118 and 119, otherwise the control proceeds to step 123.

In step 123, the time taken to attain the state in which no projection of each mark is detected by sensor light receiving portion 43b of photosensor 43 in step 121 after the 120 millisecond timer is set in step 120 is confirmed by counting time by the 120 millisecond timer set in step 122. If it is determined that the counted value exceeds 47 milliseconds, then the time taken to attain the state in which no projection of each mark is detected is determined by counting time by the 120 millisecond timer subsequently in step 123. If the state in which no projection of each mark is detected is attained before the time out flag of 120 milliseconds becomes 1, then the control proceeds to step 128. On the other hand, if the time out flag of 120 milliseconds becomes 1 before the state in which no projection of each mark is detected is attained, then the control proceeds to step 125.

In step 125, a time period of 5 seconds is set in timer 53 in response to the instruction from central controlling unit 51. The time period of 5 seconds is set to timer 53 again even if the 5 second timer is already set and counting is started. In other words, the 5 second timer is restarted.

In step 126, the value in counter 52a for temporarily storing the number of signals detected by photosensor 43 and assigned to the part of addresses of memory 52 is set to 0. In step 127, a processing for transferring the job to step 156 is carried out. Step 156 instructs execution of jobs subsequently from step 157 described above.

If the 5 second timer counts 3 seconds before detection of the projection of each mark by sensor light receiving portion 43b in steps 118 and 119, or if the state in which no projection of each mark is detected by sensor light receiving portion 43b is attained before the time out flag of 120 milliseconds becomes 1, then the stop signal is supplied to motor driving circuit 47 from central controlling unit 51 via output port 49 in step 128. Upon reception of the stop signal, motor driving circuit 47 stops applying the voltage to motor 44. Motor 44 is thus stopped.

In step 129, a time period of 100 milliseconds is set in timer 53 in response to the instruction from central controlling unit 51, and at the same time, the time out flag of 100 milliseconds is set to 0. Then, counting of 100 millisecond timer is started in parallel with carrying out the jobs in the subsequent steps. When 100 milliseconds elapses, the time out flag of 100 milliseconds is set to 1.

In step 130, a time period of 5 seconds is set in timer 53 in response to the instruction from central controlling unit 51. The time period of 5 seconds is set to timer 53 again, even if the 5 second timer is already set and counting is started. In other words, the 5 second timer is restarted.

In step 131, the value in counter 52a for temporarily storing a part of signals detected by photosensor 43 and assigned to the part of addresses of memory 52 is set to 0.

In step 132, the time out flag of 100 milliseconds in the 100 millisecond timer set in step 129 is watched with remaining in the current state. When the time out flag of 100 milliseconds becomes 1, then the control proceeds to the next step 133.

In step 133, a forward rotate signal is applied to motor driving circuit 47 from central controlling unit 51 via output port 49. Upon reception of the signal, motor driving circuit 55 applies a voltage to motor 44 such that motor 44 can rotate in a forward direction. Motor 44 thus starts to rotate forward.

A time period of 500 milliseconds is set to timer 53 in response to the instruction from central controlling unit 51, and at the same time, the time out flag of 500 milliseconds is set to 0. Then, timer 53 described above starts counting in parallel with carrying out the jobs in the subsequent steps. When 500 milliseconds elapses, the time out flag of 500 milliseconds is set to 1.

In step 135, the time out flag of 500 milliseconds in the 500 millisecond timer set in step 134 is watched with remaining in the current state. If the time out flag of 500 milliseconds is rendered 1, then the control proceeds to the next step 136.

In step 136, the stop signal is applied from central controlling unit 51 to motor driving circuit 47 via output port 49. Upon reception of the stop signal, motor driving circuit 47 stops applying the voltage to motor 44, thereby stopping motor 44.

In step 137, the time period of 100 milliseconds is set in timer 53 in response to the instruction from central controlling unit 51, and at the same time, the time out flag of 100 milliseconds is set to 0. Then, timer 53 starts counting in parallel with carrying out the jobs in the subsequent steps. When 100 milliseconds elapses, the time out flag of 100 milliseconds is set to 1.

In step 138, the time out flag of 100 milliseconds in the 100 millisecond timer set in step 137 is watched with remaining in the current state. When the time out flag of 100 millisecond rendered 1, then the control proceeds to the next step 139.

In step 139, the reverse rotate signal is applied to motor driving circuit 47 from central controlling unit 51 via output port 49. Upon reception of the reverse rotate signal, motor driving circuit 55 applies the voltage to motor 44 so that the motor 44 can rotate in the reverse direction, whereby motor 44 starts to rotate in a reverse direction.

In step 140, a time period of 200 milliseconds is set in timer 53 in response to the instruction from central controlling unit 51, and at the same time, the time of a flag of 200 milliseconds is set to 0. Then, counting is started in parallel with carrying out the jobs in the subsequent steps. When 200 milliseconds elapses, the time of a flag of 200 millisecond is set to 1.

In step 141, the time out flag of 200 milliseconds in the 200 millisecond timer set in step 140 is watched with remaining in the current state. When the time out flag of 200 milliseconds is rendered 1, then the control proceeds to the next step 144.

In step 144, a suck signal is applied to solenoid driving circuit 46 from central controlling unit 51 via output port 49. Upon reception of the suck signal, solenoid driving circuit 46 applies the voltage to solenoid 40, whereby a core of solenoid 40 is sucked.

In step 147, whether or not switch 42 is currently in the on state is determined based on the voltage applied to central controlling unit 51 from switch 42 via input port 48. If switch 42 is currently in the on state, then the control proceeds to the subsequent step 143. If switch 42 is in the off state, the control waits until switch 42 is turned on.

In step 148, a suck release signal is applied to solenoid driving circuit 46 from central controlling unit 51 via output port 49. Upon reception of the such release signal, solenoid driving circuit 46 stops supplying the voltage to solenoid 40, whereby the core of solenoid 40 is sucked to be released.

In step 149, a waiting time of 10 milliseconds is provided with remaining in the current state. More specifically, a time period of 10 milliseconds is set in timer 53 in response to the instruction from central controlling unit 51, and at the same time, the time out flag of 10 milliseconds is set to 0. When 10 milliseconds elapses, the time out flag of 10 milliseconds is set to 1. The time out flag of 10 milliseconds is always watched by central controlling unit 51, so that when the time out flag is rendered 1, the control proceeds to the next step 150.

In step 150, the stop signal is applied to motor driving circuit 47 from central controlling unit 51 via output port 49. Upon reception of the stop signal, motor driving circuit 47 stops supplying the voltage to motor 44, whereby motor 44 is stopped.

Step 151 is provided for transferring the job to step 105.

Step 105 is provided for carrying out the jobs subsequently from step 106 described above.

When the job is transferred from steps 164 to 165, whether or not the projection of each mark is detected by sensor light receiving portion 43b of photosensor 43 is determined based on the voltage applied to central controlling unit 51 from photosensor 43 via input port 48. If no projection is detected currently, then the control waits until some projection is detected. If the projection is detected, the control proceeds to step 167.

In step 167, the time out flag of 120 milliseconds in the 120 millisecond timer set in step 120 is watched. The control proceeds to step 168 if the time flag of 120 milliseconds is 0, while the control proceeds to step 169 if the time out flag of 120 milliseconds is 1.

Step 168 is provided for transferring the job to step 159.

Step 159 is provided for carrying out the job subsequently from step 160 described above.

In step 169, a time period of 40 milliseconds is set in timer 53 in response to the instruction from central controlling unit 51, and at the same time, the time out flag of 40 milliseconds is set to 0. Then, timer 53 starts counting in parallel with carrying out the jobs in the subsequent steps. When 40 milliseconds elapses, the time out flag of 40 milliseconds is set to 1.

In step 170, whether or not the projection of each mark is detected by sensor light receiving portion 43b of photosensor 43 is determined based on the voltage applied to central controlling unit 51 from photosensor 43 via input port 48. If the projection is currently detected, then the control proceeds to step 172. On the contrary, if no projection is detected, then the control proceeds to step 171.

Step 171 is provided for transferring the job to step 161.

Step 161 is provided for carrying out the job subsequently from step 162 described above.

In step 172, the time out flag of 40 milliseconds in the 40 millisecond timer set in step 169 is watched. Then, the control returns to step 170 if the time of flag of 40 millisecond is 0, while the control proceeds to step 173 if the time out flag of 40 millisecond is 1.

In step 173, the value in counter 52a for temporarily storing the number of signals detected by photosensor 43 and assigned to the part of addresses in memory 52 is written to another address as a disc tray number.

In step 174, determination is made as to whether initialization is being carrying out after power-on of the apparatus or initialization of the apparatus is already finished so that the apparatus is being operated by selecting a desired disc tray. If the former state is determined, the control proceeds to step 177, while in the latter state the control proceeds to step 175.

One method to determine which of steps 177 and 175 is selected is to provide a flag in an arbitrary address of memory 52, the flag being set to 1 during initialization of the apparatus and being set to 0 upon completion of the initialization, such that the initialization state of the apparatus can be determined depending on whether such a flag is 1 or 0.

If it is determined that the apparatus is already in operation by selecting the desired tray after completion of initialization in step 174, a comparison is made between values of current tray number 52b and target tray number 52c in step 175. If the values match, the control proceeds to step 180, otherwise the control proceeds to step 176.

Step 176 is provided for transferring the job to step 230.

Step 230 is provided for carrying out the job subsequently from step 231 described below.

If it is determined that the apparatus is during initialization in step 174, a value of current tray number 52b assigned to the part of addresses in memory 52 is written as target tray number 52c in step 177, then the control proceeds to step 180.

In step 180, the suck signal is applied to solenoid driving circuit 46 from central controlling unit 51 via output port 49. Upon reception of the suck signal, solenoid driving circuit 46 applies the voltage to solenoid 40, whereby the core of solenoid 40 is sucked.

In step 186, whether or not switch 42 is currently in the on state is determined based on the voltage applied to central controlling unit 51 from switch 42 via input port 48. If switch 42 is currently in the off state, the waiting state is entered. If switch 42 is currently in the on state, then the control proceeds to step 186.

In step 187, the suction release signal is applied to solenoid driving circuit 46 from central controlling unit 51 via output port 49. Upon reception of the suction release signal, solenoid driving circuit 46 stops supplying the voltage to solenoid 40, whereby suction of the core of solenoid 40 is released.

In step 188, the waiting time of 10 milliseconds is provided with remaining in the current state. More specifically, at the same time as a time period of 10 milliseconds is set in timer 53 in response to the instruction from central controlling unit 51, the time out flag of 10 milliseconds is set to 0. After the elapse of 10 milliseconds, the time out flag of 10 milliseconds is set to 1. The time out flag of 10 milliseconds is always watched by central controlling unit 51. When the time out flag is rendered 1, the control proceeds to the next step 189.

In step 189, the stop signal is applied to motor driving circuit 47 from central controlling unit 51 via output port 49. Upon reception of the stop signal, motor driving circuit 47 stops supplying the voltage to motor 44, whereby motor 44 is stopped.

In step 190, whether or not the projection of each mark is detected by sensor light receiving portion 43b of photosensor 43 is determined based on the voltage applied to central controlling unit 51 from photosensor 43 via input port 48. If the projection is currently detected, then the control proceeds to step 192, while the control proceeds to step 191 if no projection is currently detected.

In step 191, the current disc tray number assigned to the part of the addresses in memory 52 is set to 1.

Step 192 is provided for transferring the job to step 108.

Step 108 is provided for carrying out the job subsequently from step 109.

If the job is transferred from steps 176 to 230, then the control proceeds to step 231.

In step 231, a comparison is made between the values of the current disc tray number and target disc tray number, and if the target disc number is smaller than the current disc number, the control proceeds to step 232. On the contrary, if the target disc number is larger than the current disc number, then the control proceeds to step 237.

In step 232, determination is made as to whether or not motor 44 has been rotated forward or backward before step 232, and if motor 44 has been rotated forward, the control proceeds to step 236, otherwise the control proceeds to step 233.

In step 233, at the same time as a time period of 100 milliseconds is set in timer 53 in response to the instruction from central controlling unit 51, the time out flag of 100 milliseconds is set to 0. Then, counting of time is carried out by timer 53 in parallel with carrying out the job in the subsequent steps. When 100 milliseconds elapses, the time out flag 100 milliseconds is set to 1.

In step 234, the time out flag of 100 milliseconds in the 100 millisecond timer set in step 233 is watched with remaining in the current state. If the time out flag of 100 milliseconds is rendered 1, then the control proceeds to the next step 235.

In step 235, the reverse rotate signal is applied to motor driving circuit 47 from central controlling unit 51 via output port 49. Upon reception of the reverse rotate signal, motor driving circuit 55 applies a voltage to motor 44 so that motor 44 can rotate in the reverse direction. Motor 44 thus starts to rotate in the reverse direction.

Step 236 is provided for transferring to the job to step 153.

Step 153 is provided for carrying out the job subsequently from step 154.

In step 237, determination is made as to whether or motor 44 has been rotated forward or backward before step 237. If the motor 44 has been rotated forward, then the control proceeds to 238, otherwise the control proceeds to step 241.

In step 238, at the same as a time period of 100 milliseconds is set in timer 53 in response to the instruction from central controlling unit 51, the time out flag of 100 milliseconds is set to 0. Then, counting of time is carried out by timer 53 in parallel with carrying out the job in the subsequent steps. When 100 milliseconds elapse, the time out flag of 100 milliseconds is set to 1.

In step 239, the over flag of 100 milliseconds in the 100 millisecond timer set in step 238 is watched with keeping the current state. When the time out flag of 100 milliseconds is rendered 1, the control proceeds to the next step 240.

In step 240, the forward rotate signal is applied to motor driving circuit 47 from central controlling unit 51 via output port 49. Upon reception of the forward rotate signal, motor driving circuit 55 applies the voltage to motor 44 so that motor 44 can rotate forward. Motor 44 thus starts to rotate forward.

Step 241 is provided for transferring the job to step 153.

Step 153 is provided for carrying out the job subsequently from step 154.

Step 110 waits for input of the signal indicating that the desired disc number tray is selected from the disc tray array by disc tray select switch group (tray select switch) 54, as described above. Step 212 waits for input of the signal indicating that the desired disc number tray is selected.

The target tray number input in step 212 is written in target disc number 52c in step 213 assigned to the part of the addresses in memory 52.

In step 214, a comparison is made between the current disc number and the target disc number. If those numbers match, then the control returns to step 212 and waits for a key input. If those numbers are different, then control proceeds to step 215.

In step 215, upon comparison of the current disc number with the target disc number, if the target disc number is smaller than the current disc number, then the control proceeds to step 216. On the contrary, if the current disc number is smaller than the target disc number, then the control proceeds to step 219.

In step 216, the reverse rotate signal is applied to motor driving circuit 47 from central controlling unit 51 via output port 49. Upon reception of the reverse rotate signal, motor driving circuit 55 applies a voltage to motor 44 so that motor 44 can rotate in the reverse direction. Motor 44 thus starts to rotate in the reverse direction.

In step 217, the light source turn-on signal is applied to photosensor light source driving circuit 55 from central controlling unit 51 via output port 49. Upon reception of the signal, photosensor light source driving circuit 55 applies a voltage to the LED serving as sensor light source 43 of photosensor 43, thereby turning on the LED. Thus, photosensor 43 can attain the state which allows detection of the presence of the projection of each mark.

Step 218 is provided for transferring the job to step 153.

Step 153 is provided for carrying out the job subsequently from step 154.

In step 219, the forward rotate signal is applied to motor driving circuit 47 from central controlling unit 51 via output port 49. Upon reception of the forward rotate signal, motor driving circuit 55 applies a voltage to motor 44 so that motor can rotate in the forward direction. Motor 44 thus starts to rotate in the forward direction.

In step 220, whether the current disc number during the stop condition is 1 is determined. If the current disc number is 1, then the control proceeds to step 223, otherwise the control proceeds to step 221.

In step 223, the light source turn-on signal is applied to photosensor light source driving circuit 55 from central controlling unit 51 via output port 49. Upon reception of the signal, photosensor light source driving circuit 55 applies a voltage to the LED serving as sensor light source 43a of photosensor 43, thereby turning on the LED. Thus, photosensor 43 can detect the presence of the projection of each mark.

Step 224 waits for detection of projection n of the stop position detecting mark by photosensor 43 and upon detection the control proceeds to step 225.

Step 225 is provided for transferring the job to step 153.

Step 153 is provided for carrying out the job subsequently from step 154.

In step 221, the light source turn-on signal is applied to photosensor light source driving circuit 55 from central controlling unit 51 via output port 49. Upon reception of the signal, photosensor light source driving circuit 55 applies voltage to the LED serving as sensor light source 43a of photosensor 43, thereby turning on the LED. Thus, photosensor 43 can detect the presence of the projection of each mark.

Step 222 is provided for transferring the job to step 153.

Step 153 is provided for carrying out the job subsequently from step 154.

Now, the 5 second timer described above will be described in detail. At the same time, what kind of processing is carried out in the case when the time out flag of 5 seconds attains 1 will be described.

The 5 second timer serves to watch, like a watching timer, whether a predetermined job is finished within the preset time if the job is not finished within the time, the 5 second timer carries out a predetermined processing.

In step 193, a time period of 5 seconds is set in timer 53 in response to the instruction from central controlling unit 51, and at the same time, the time out flag of 5 seconds is set to 0 in step 194. Even if other job is being carried out, counting of time by timer 53 described above can be carried out in parallel in step 195. When 5 seconds are counted, the control proceeds to the next step 196 in which the time out flag is set to 1.

In the present apparatus, even if the 5 second timer is already set, the 5 second timer will be set again so as to restart counting time before the time out flag of 5 seconds attains 1, except for the stop condition of step 110. When the job is finished, the stop condition is entered in step 110.

In the event that any malfunction of the apparatus causes the 5 second timer to be set so as to restart counting of time, or that the job is finished whereby 5 seconds are counted before the stop condition is entered in step 110, then the time out flag is set to 1 in step 196.

While the 5 second timer is set, the time out flag of 5 seconds is always watched so that the flag is 0. If the time out flag of 5 seconds attains 1, the job is transferred from step 197 to step 198 with the job which is carried out at that time being maintained.

When the job is transferred to step 198, the light source turn-on signal is applied to photosensor light source driving circuit 55 from central controlling unit 51 via output port 49 in step 199. Upon reception of the signal, photosensor light source driving circuit 55 stops applying the voltage to the LED serving as sensor light source 43a of photosensor 43, thereby turning off the LED. Thus, photosensor 43 cannot detect the presence of the projection of each mark.

In step 200, the suction release signal is applied to solenoid driving circuit 46 from central controlling unit 51 via output port 49. Upon reception of the suction release signal, solenoid driving circuit 46 stops supplying the voltage to solenoid 40, whereby suction of the core of solenoid 40 is released.

In step 201, the stop signal is applied to motor driving circuit 47 from central controlling unit 51 via output port 49. Upon reception of the stop signal, motor driving circuit 47 stops applying the voltage to motor 44, thereby stopping motor 44.

In step 202, a time period of 100 milliseconds is set in timer 53 in response to the instruction from central controlling unit 51, and at the same time, the time out flag of 100 milliseconds is set to 0. Then, counting of time is carried out by timer 53 in parallel with carrying out the job of the subsequent steps. When 100 milliseconds elapse, the time out flag of 100 milliseconds is set to 1.

In step 203, the time out flag of 100 milliseconds in the 100 millisecond timer set in step 202 is watched with keeping the current state. When the time out flag of 100 milliseconds attains 1, the control proceeds to the next step 204.

In step 204, whether or not motor 44 has been rotated forward or backward before step 204 is determined. If motor 4 has been rotating forward, then the control proceeds to 205, otherwise the control proceeds to step 206.

In step 205, the reverse rotate signal is applied to motor driving circuit 47 from central controlling unit 51 via output port 49. Upon reception of the reverse signal, motor driving circuit 55 applies the voltage to motor 44 so that motor 44 can rotate in the reverse direction. Motor 44 thus starts to rotate in the reverse direction.

In step 206, the forward rotate signal is applied to motor driving circuit 47 from central controlling unit 51 via output port 49. Upon reception of the forward rotate signal, motor driving circuit 55 applies the voltage to motor 44 so that motor 44 can rotate in the forward direction. Motor 44 thus starts to rotate in the forward direction.

In step 207, a time period of 1 second is set in timer 53 in response to the instruction from central controlling unit 51, and at the same time, the time out flag of 1 second is set to 0. Then, counting of time is carried out by timer 53 in parallel with carrying out the job in the subsequent steps. When 1 second elapses, the time out flag of 1 second is set to 1.

In step 208, the time out flag of 1 second in the 1 second timer set in step 207 is watched with keeping the current state. When the time out flag of 1 second attains 1, the control proceeds to 209.

In step 209, the stop signal is applied to motor driving circuit 47 from central controlling unit 51 via output port 49. Upon reception of the stop signal, motor driving circuit 47 stops supplying the voltage to motor 44, whereby motor 44 is stopped.

An error stop condition is attained in step 210 after the jobs in steps 198-209 caused by time out of the 5 second timer.

Now, several other operational examples of the disc reproducing apparatus will be described below by associating the flow charts shown in FIGS. 13-17 and 19 with the operation of the disc reproducing apparatus of this embodiment.

If the power supply is turned on when No. 1 disc tray 13 is stopped in the reproducing position and reproducing unit 8 is elevated, the detect operation of photosensor 43 is enabled in step 102. The 5 second timer is set in step 103. Switch 42 for detecting elevation of the reproducing unit is turned on in step 104 because reproducing unit 8 has been elevated, whereby the control proceeds to step 106.

In step 106, projection n of the stop position detecting mark is not detected by photosensor 43 (see FIG. 7), since No. 1 disc tray 13 is stopped in the reproducing position. Accordingly, a position is written in current tray number 52b in step 107 and photosensor 43 is turned off in step 109, then the stop condition is entered in step 110.

More specifically, if the power supply is turned on when No. 1 disc tray 13 is stopped in the reproducing position and reproducing unit 8 is elevated, initialization is completed without operating any mechanism.

Next, if the power supply is turned on when No. 3 disc tray 15 is stopped in the reproducing position and reproducing unit 8 is elevated, steps 102 and 103 are carried out as in the above case. Switch 42 for detecting elevation of the reproducing unit is turned on in step 104 since reproducing unit 8 is elevated, whereby the control proceeds to step 106.

In step 106, projection m of the stop position detecting mark is detected by photosensor 43, since No. 3 disc tray 15 is stopped in the reproducing position (see FIG. 6). Accordingly, motor 44 starts to rotate reversely in step 152. This causes the elevating/lowering means of the reproducing unit to operate, thereby lowering reproducing unit 8.

After steps 154 and 155, disc tray array 12 starts moving in the direction of arrow A in step 157 until projection m of the stop position detecting mark is not detected by photosensor 43.

When projection m of the stop position detecting mark is no more detected by photosensor 43, instead the first projection i1 of disc number detecting mark o is detected by photosensor 43. Step 158 waits for detection of projection i1.

After detection of projection i1, step 160 waits until projection i1 is not detected.

Projection i1 cannot be detected in step 160 because detection of slit s1 located adjacent to projection i1 is started or detection of the region located between disc number detecting mark o and the stop position detecting mark is started. In order to identify between these two detections, whether or not the next projection i2 is detected within a certain time period is determined. More specifically, if the next projection i2 is detected within a certain period of time, it is determined that projection i2 is detected after passing by projection s1. On the contrary, if the certain time period has already elapsed upon detection of the next projection, it can be determined that projection m of the stop position detecting mark is detected. The 120 millisecond timer is started in step 162 in order to count such time.

The time period of 120 milliseconds is calculated based on the conditions of the disc reproducing apparatus according to this embodiment described above, so that the setup value can be altered depending on the conditions such as the operating speed.

In step 163, a value in counter 52a is added by 1, because passage of projection i1 is confirmed in step 160.

Upon detection of the projection in step 166, the time out flag of 120 milliseconds is confirmed in step 167. If there is no time out, it indicates detection of projection i2, so that the control returns to step 160.

Step 160 waits until projection i2 is not detected.

Projection i2 cannot be detected in step 160 only after projection i2 is passed. Accordingly, the 140 millisecond timer is set again in step 162, and the value in counter 52a is added by 1 in step 163 to total 2.

Upon detection of the projection in step 166, the time out flag of 120 milliseconds is confirmed in step 167.

In this example, No. 3 disc tray 15 is moved in the direction of arrow A from the reproducing position, so that projections to be detected are two projections i1 and i2 of the disc number detecting mark of No. 2 disc tray 14.

Therefore, the control returns to step 160 twice at a branch of step 167 as long as the operation is carried out normally. When the control reaches step 167 for the third time, the time out of the 120 millisecond timer occurs, whereby the control proceeds to step 169.

Now, it is assumed that the time out of the 120 millisecond timer has occurred by applying an external pressure (e.g. pressure by hands) so as to temporarily stop the operation of the disc tray array at slit s1 located next to projection i1, and then, by releasing such external pressure, whereby the control reaches step 169. As a protection for such a case, the 40 millisecond timer is set in step 169 so that it is confirmed in steps 170 and 171 that the next projection is not detected within 40 milliseconds. The time period of 40 milliseconds is calculated based on the conditions set in the disc reproducing apparatus of this embodiment, so that the setup value needs to be changed as the conditions such as the operating speed is altered. Detection of the projection in steps 170 and 171 is regarded as the result of malfunction due to prevention of the disc tray operation by the external pressure described above, whereby the control proceeds to step 162.

If the control proceeds without any problems thanks to the protection described above, then the value in counter 52a is written into current tray number 52b in step 173.

The control proceeds from step 174 to step 177, because initialization is being carried out by power-on, and the current tray number is written into target tray number 52c.

In step 180, when the disc tray comes to be in the normal position by turning on (sucking) solenoid 40, reproducing unit 8 starts to elevate by the reproducing unit elevating means. Then, upon detection of elevation of reproducing unit 8 in step 186, solenoid 40 is turned off in step 187. After the waiting time of 10 milliseconds in step 188, motor 44 is stopped in step 189.

In this example, after initialization is carried out in the case when No. 3 disc tray 15 is in the normal position, if No. 2 disc tray 14 comes to be in the normal position, then reproducing unit 8 is expected to be elevated. Accordingly, projection m of the stop position detecting mark is detected by photosensor 43.

When reproducing unit 8 completes its elevation, if the projection of the stop position detecting mark is not detected by photosensor 43, it is considered that No. 1 disc tray 13 is stopped in the normal position due to incorrect counting.

In order to correct this state, detection of the projection of the stop position detecting mark is confirmed by photosensor 43 in step 190.

If projection n of the stop position detecting mark is not detected by photosensor 43, target tray number 52c and current tray number 52b are written with 1 in step 191, and then the control proceeds to step 109. In the meanwhile, if projection m of the stop position detecting mark is detected by photosensor 43, then the control proceeds to step 109 without changing the current value.

After turning off photosensor 43 in step 109, the stop state is entered in step 110, thereby completing initialization.

Although No. 3 disc tray 15 is in the normal position before power-on in this case, the processing will be the same if one of No. 2–No. 5 disc trays 14–17 is in the normal position before power-on. In that case, the number of times with which the processing from steps 160 through 167 is repeated is varied depending on the number of disc number detecting marks o.

If No. 3 disc tray 15 is stopped in the reproducing position and reproducing unit 8 is stopped halfway to elevate before power-on, steps 102 and 103 are carried out first as in the above case.

In step 104, switch 42 for detecting elevation of the reproducing unit is turned off because reproducing unit 8 is halfway to elevate, so that the control proceeds to step 111.

Motor 44 starts to rotate reversely in step 111, whereby the elevating means of the reproducing unit starts to operate. Accordingly, reproducing unit starts to elevate. The 100 millisecond timer is set in step 112.

100 milliseconds is the time required to complete elevation of reproducing unit 8 under the conditions of the disc reproducing apparatus of this embodiment described above plus some spare time. Therefore, such a setup value needs to be altered depending on conditions such as the operating speed.

In steps 113 and 114, a comparison is made to determine which of turning on of switch 42 and the time out flag of the 100 millisecond timer happens first. In this case, the operation is started when reproducing unit 8 is halfway to elevate, so that switch 42 should be turned on before the time out occurs as long as the operation is normal.

After switch 42 is turned on, a waiting time of 10 milliseconds is provided in step 115 and motor 44 is stopped in step 116.

Subsequently, the same operation as in the case when No. 3 disc tray 15 is stopped in the reproducing position and reproducing unit 8 is halfway to elevate before power-on will be carried out. More specifically, initialization is completed when No. disc tray 14 is stopped in the normal position and reproducing unit 8 is elevated.

Although No. 3 disc tray 15 is stopped in the reproducing position and reproducing unit 8 is halfway to elevate before power-on in this case, the similar processing will be carried out if No. 3 disc tray 15 is replaced by one of No. 2–No. 5 disc trays 15–17. In that case, the number of times with which the processing from steps 160 through 167 is repeated is varied depending on the number of disc number detecting marks o.

If reproducing unit 8 is lowered and No. 3 and 4 disc trays 15 and 16 are stopped on the way to the reproducing position before power-on, then steps 102 and 103 are carried out first as in the case described above. Then, motor 44 starts to rotate reversely in step 111 and the 100 millisecond timer is set in step 112.

In steps 113 and 114, a comparison is made to determine which of turning on of switch 42 and time out of the 100 millisecond timer happens first. In this case, since the operation is started when reproducing unit 8 is lowered, the time out of the 100 millisecond timer happens first in most of the cases before switch 42 is turned on, and the control proceeds to step 117. If switch 42 is turned on before time out, then control proceeds to step 115 as in the case described above so as to carry out processings in respective steps until the stop state is entered.

Step 117 waits until no projection of either the stop position detecting mark or the disc number detecting mark is detected. In steps 118 and 119, a comparison is made to determine which of elapse of 3 seconds by the 5 second timer set in step 103 and detection of projections happens first.

If No. 1 disc tray is placed close to its normal position and the reproducing unit elevating means is stopped or is not in operation before power-on, motor 44 starts to rotate reversely. Accordingly, disc tray array 12 is moved in the direction of arrow A, whereby No. 1 disc tray 13 goes over even the normal position to hit against a mechanical stopper, whereby the disc tray cannot travel any further.

Step 119 determines to proceed to a special processing described below when the above state is attained. If No. 3 and No. 4 disc trays 15 and 16 are stopped on the way to the stop position as in this case, the detection of the projection happens earlier than the elapse of 3 seconds as long as the operation is normal. The control then proceeds to step 120.

Upon detection of the projection in step 118, the 120 micro-second timer is set in step 120. Then, step 120 waits until no projection is detected. When no projection is detected, determination is made as to whether or not the count of the 120 millisecond timer exceeds 47 milliseconds in step 122. If the count is below 47 milliseconds, the control returns to step 118, otherwise the control proceeds to step 123.

The above processing is necessary because if the projection is detected when the operation of the disc tray is started with reproducing unit 8 being not elevated, it cannot be determined whether or not the projection is of the disc number detecting mark or of the stop position detecting mark. In other words, the above processing attempts to count correctly the number of disc number detecting marks o by carrying out the processing as in the normal case from the point when projection m or n of the stop position detecting mark is confirmed.

Given the conditions of this apparatus described above, the time required before projections i1–i5 of disc number detecting mark o cannot be detected will not exceed 47 milliseconds as long as the operation is carried out normally. Therefore, if it takes more than 47 milliseconds in this processing, the projection can be identified as projection m or n of the stopping position detecting mark.

If the passage time of the projection exceeds 47 milliseconds in step 122, it is determined whether the projection is projection m or n of the stopping position detecting mark in step 123.

As mentioned in the conditions of this apparatus described above, it takes about 211 milliseconds for projection m to pass by photosensor 43, and it takes 70.3 milliseconds for projection n to pass by photosensor 43. Therefore, if the time out flag of 120 milliseconds attains 1 with the projection being detected, the projection is identified as projection m of the stopping position detecting mark. If the projection comes not to be detected while the time out flag of 120 milliseconds is 0, then the projection can be identified as projection n.

The width of projection n of the stopping position detecting mark is set 3 times wider than respective width of the disc number detecting marks i1–i5, and the width of projection m of the stop position detecting mark is set 3 times wider than projection n in the conditions of this apparatus. Therefore, identification of respective marks can be facilitated by using the time required for the projection to pass by photosensor 43. identification among 3 types of projections can be made even if the speed with which the projection passes by photosensor 43 is somewhat altered due to variation in temperature or load.

When the projection is identified as stop position detecting mark n in step 123, motor 44 is rotating reversely and disc tray array 12 moves in the direction of arrow A. Accordingly, the disc tray already goes over the normal position. Therefore, the similar situation is attained as in the case when No. 1 disc tray is located closer to the normal position and the elevating means of the reproducing unit is stopped or is not operated before power-on, which will be described later. In this case, the processings of the subsequent steps from step 128 will be carried out.

When the projection is identified as projection m of the stop position detecting mark in step 123, the 5 second timer is restarted in step 125. The value in counter 52a is set to 0 in step 126, and the control proceeds to step 157.

The subsequent processings are the same as those described above.

Now, description will be made as to the case when No. 1 disc tray 13 is located closer to the normal position and the elevating unit of the reproducing unit is stopped or is not operated before power-on.

The processings up to step 119 are the same as those in the case described above. In this case, however, when motor 44 rotates reversely and disc tray array 12 moves in the direction of arrow A, No. 1 disc tray 13 goes over the normal position to hit against the mechanical stopper, whereby disc tray 13 cannot travel any further.

In step 119, when 3 seconds have elapsed in the 5 second timer after this state is attained, the control proceeds to step 128 in which motor 44 is stopped and the 100 millisecond timer is set. The 100 millisecond timer secures a waiting time for completely stopping the operation of motor 44 which has been rotated reversely by its inertial force, so that motor 44 can rotate forward in step 133 described below.

If motor 44 is forced to be rotated forward instantly without any waiting time, an unreasonable force is exerted on the operating parts, so that a disadvantage such as damage of the gear might occur. Thus, the 100 millisecond timer is provided for protection.

The 5 second timer is restarted in step 130, and the value in counter 52a is set to 0 in step 131, whereby the control proceeds to step 132.

When time out of the 100 millisecond timer occurs in step 132, motor 44 starts to rotate forward in step 133. Then, the 500 millisecond timer is set in step 134. The 500 millisecond timer is provided to secure sufficient time for the disc tray to go over the normal position to further move in the direction of arrow B after disc tray array 12 starts to operate in the direction of arrow B by forward rotation of motor 44. It is noted that a time period of 500 milliseconds is calculated based on the conditions of this apparatus, so that the setup value needs to be changed depending on the conditions such as the operating speed.

When the time out of 500 milliseconds is confirmed in step 135, motor 44 is stopped in step 136. Then, the waiting time necessary to completely stop the operation of motor 44 which has been rotating forward by its inertia force is provided in steps 137 and 138, whereby motor 44 can rotate reversely in step 139.

When motor 44 starts to rotate reversely in step 139, disc tray array 12 starts to operate in the direction of arrow A. Then, the 200 millisecond timer is set in step 140, and the time out of this timer is confirmed in step 141, by which the solenoid is turned on (or sucked) in step 144.

The time set by this 200 millisecond timer is approximately the same as the time taken to detect projection n of the stop position detecting mark by photosensor 43 with disc tray array 12 operating normally. Such setup time needs to be altered depending on the conditions such as the operating speed.

It is noted that the operation is substantially the same if the solenoid is turned on based on the detection of stop position detecting mark n by photosensor 43, instead of providing the 200 millisecond timer.

Turning on of the solenoid in step 144 causes to start elevation of reproducing unit 8 by the elevating means of the reproducing unit when No. 1 disc tray 13 reaches the normal position. When elevation of reproducing unit 8 is detected in step 147, the solenoid is turned off in step 148. After providing the waiting time of 10 milliseconds in step 149, motor 44 is stopped in step 150.

Subsequently, the processing continues from step 107 as in the case described above.

Now, description will be made as to an operation for moving a desired disc tray to the normal position by selecting the disc tray during the stop state.

Figure 13:
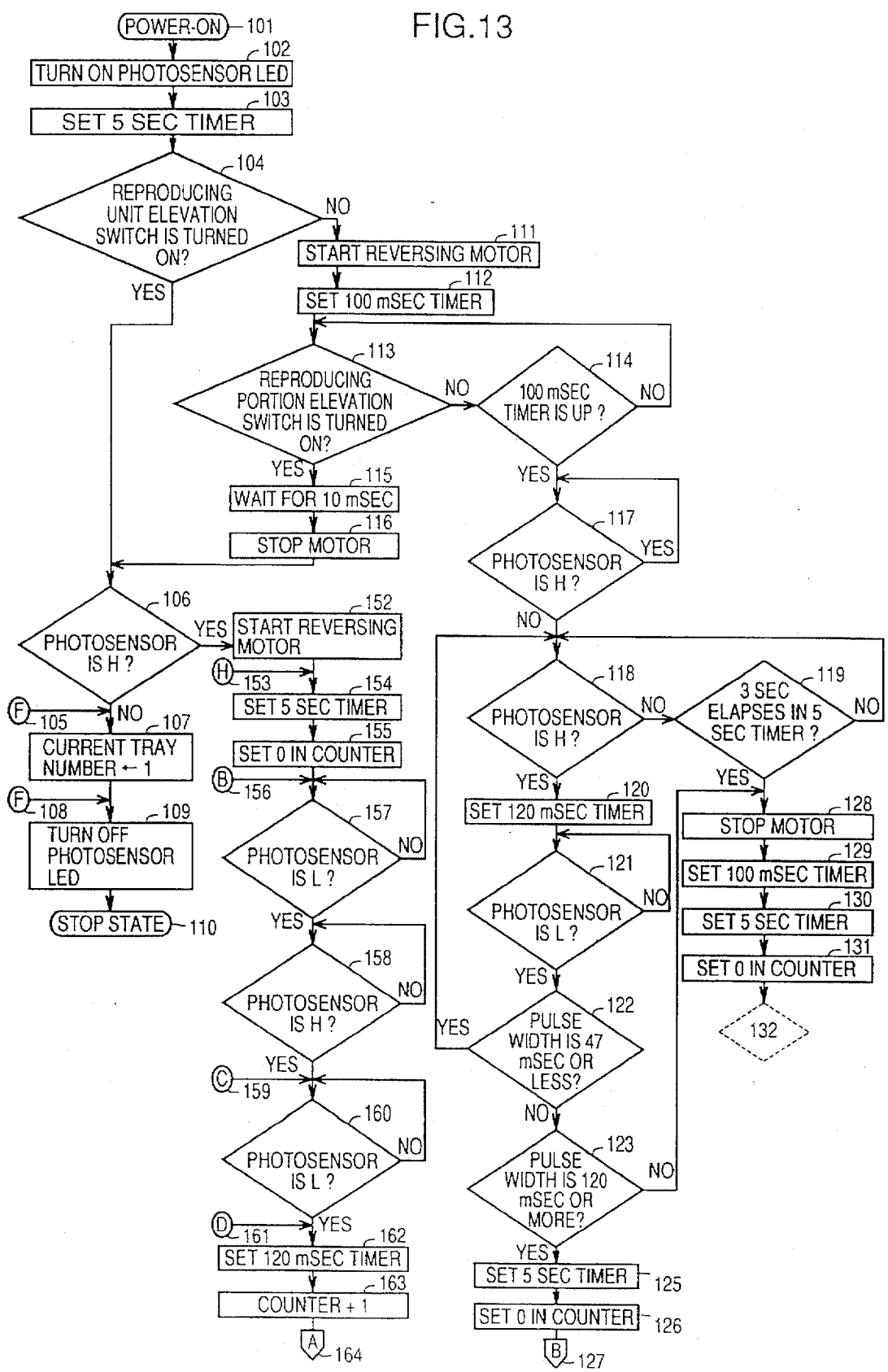
FIG. 13 is a first flow chart for use in illustrating a control means of the disc reproducing apparatus according to one embodiment of the present invention.
Figure 14:
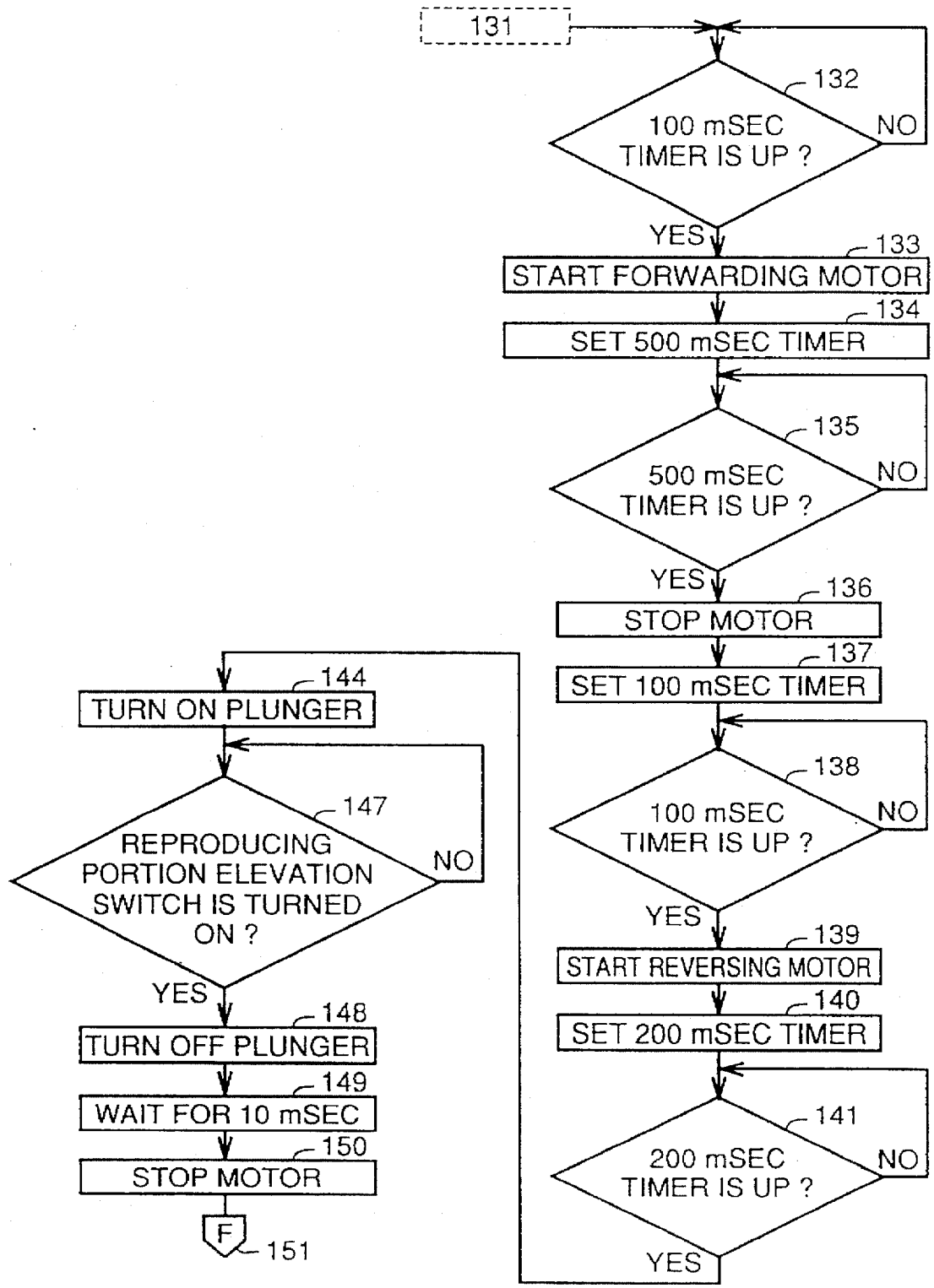
FIG. 14 is a second flow chart for use in illustrating a control means of the disc reproducing apparatus according to one embodiment of the present invention.
Figure 15:
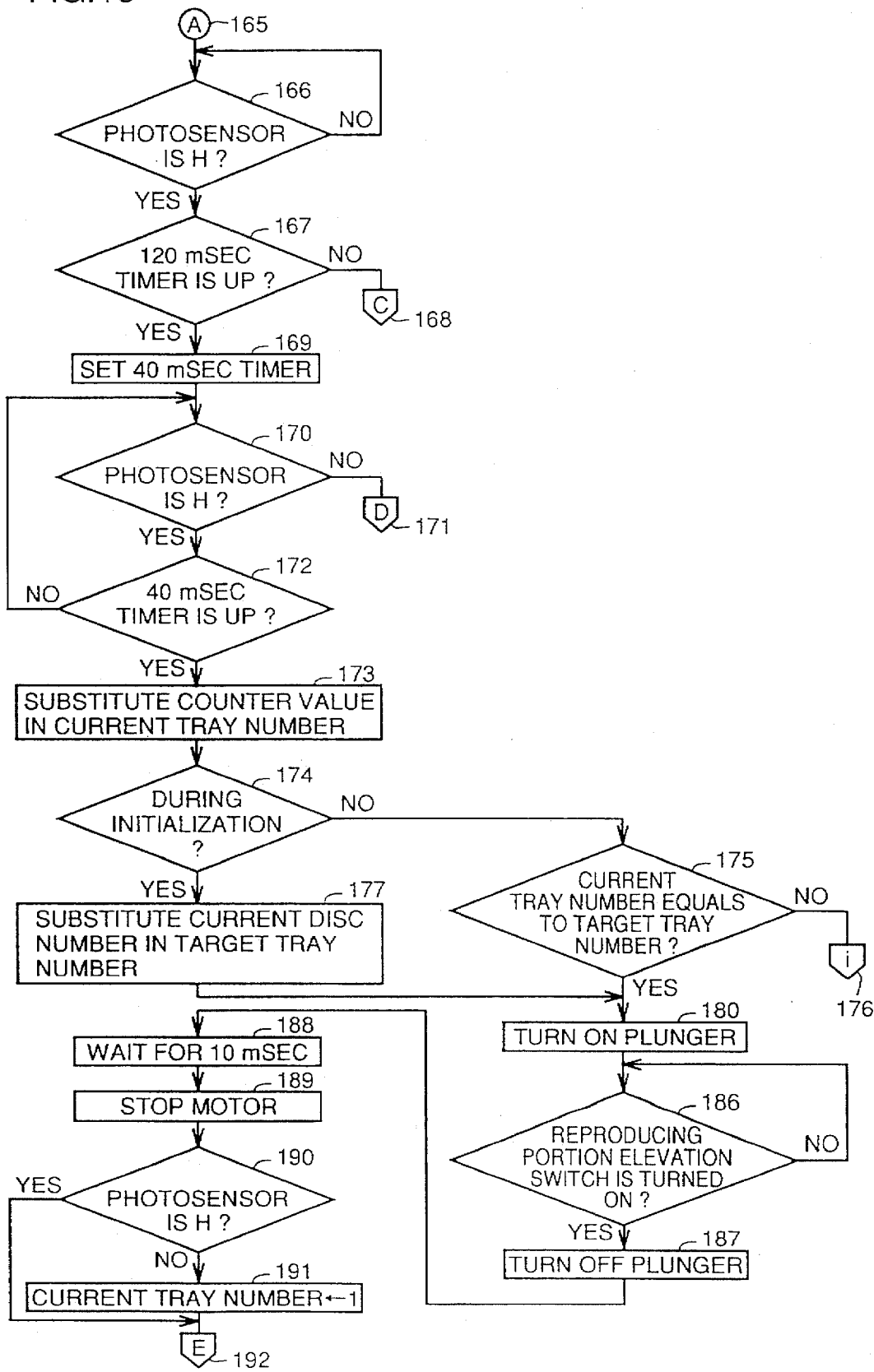
FIG. 15 is a third flow chart for use in illustrating the disc reproducing apparatus according to one embodiment of the present invention.
Figure 16:
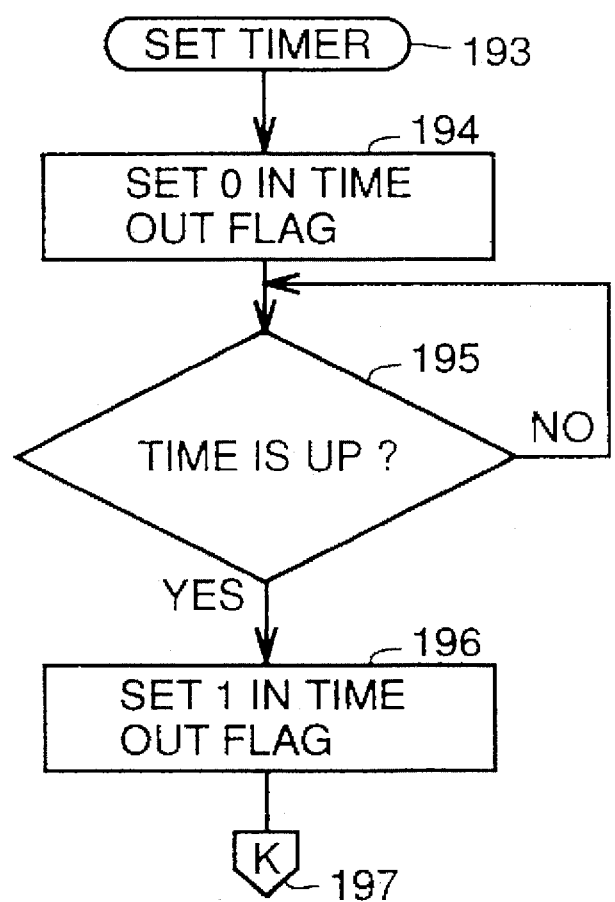
FIG. 16 is a fourth flow chart for use in illustrating the disc reproducing apparatus according to one embodiment of the present invention.
Figure 17:
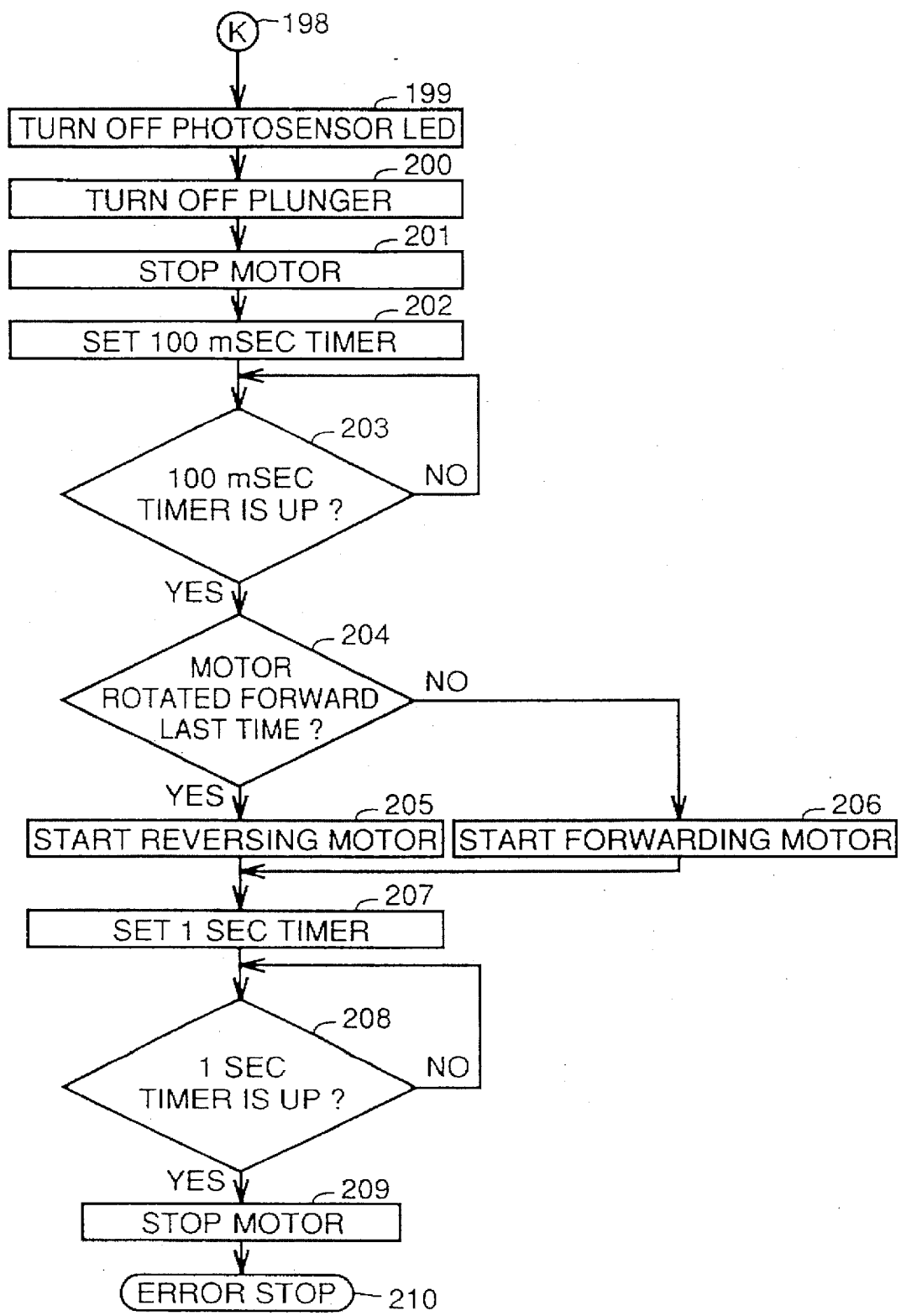
FIG. 17 is a fifth flow chart for use in illustrating a control means of the disc reproducing apparatus according to one embodiment of the present invention.
Figure 18:
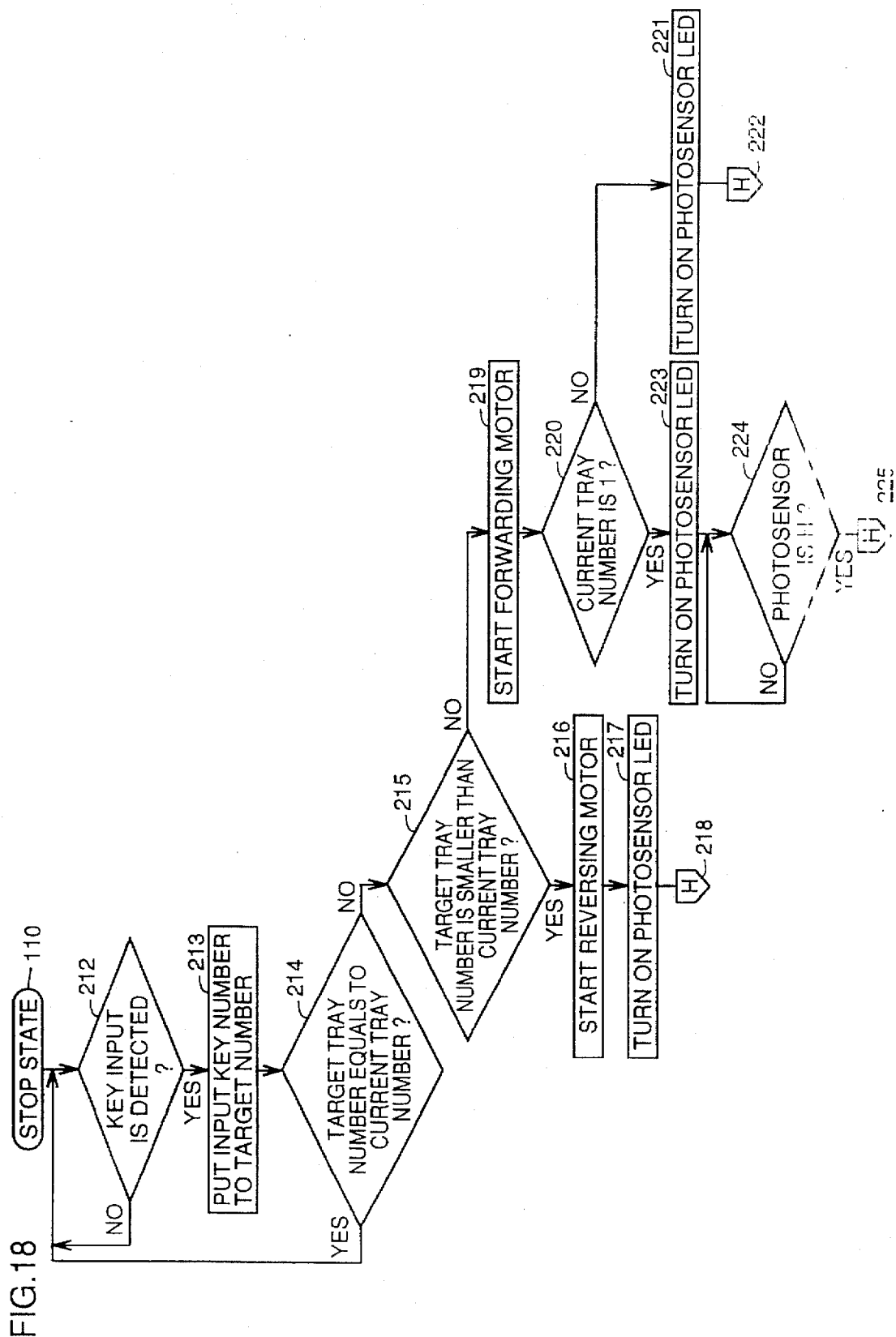
FIG. 18 is a sixth flow chart for use in illustrating a control means of the disc reproducing apparatus according to one embodiment of the present invention.
Figure 19:
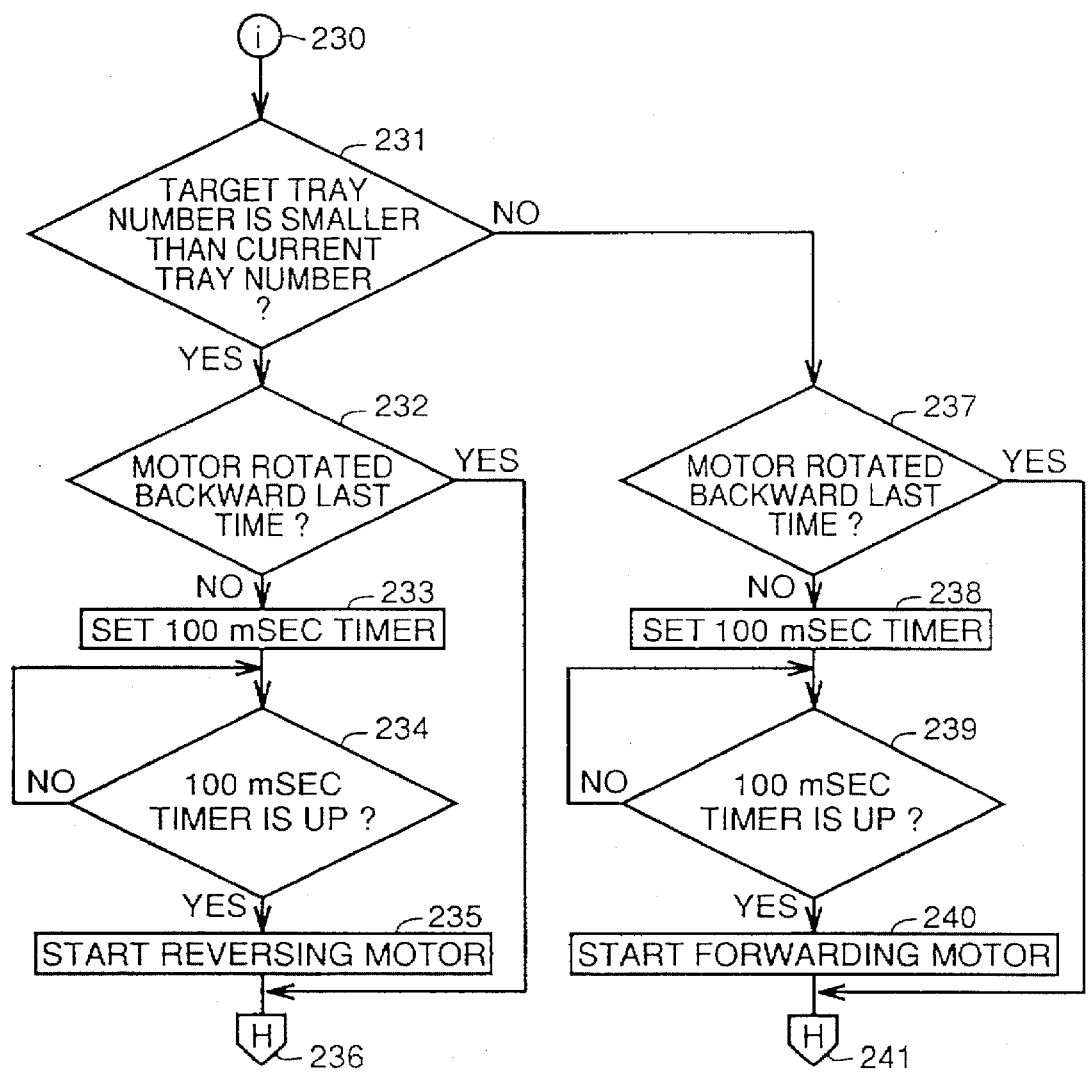
FIG. 19 is a seventh flow chart for use in illustrating a control means of the disc reproducing apparatus according to one embodiment of the present invention.
Figure 20:
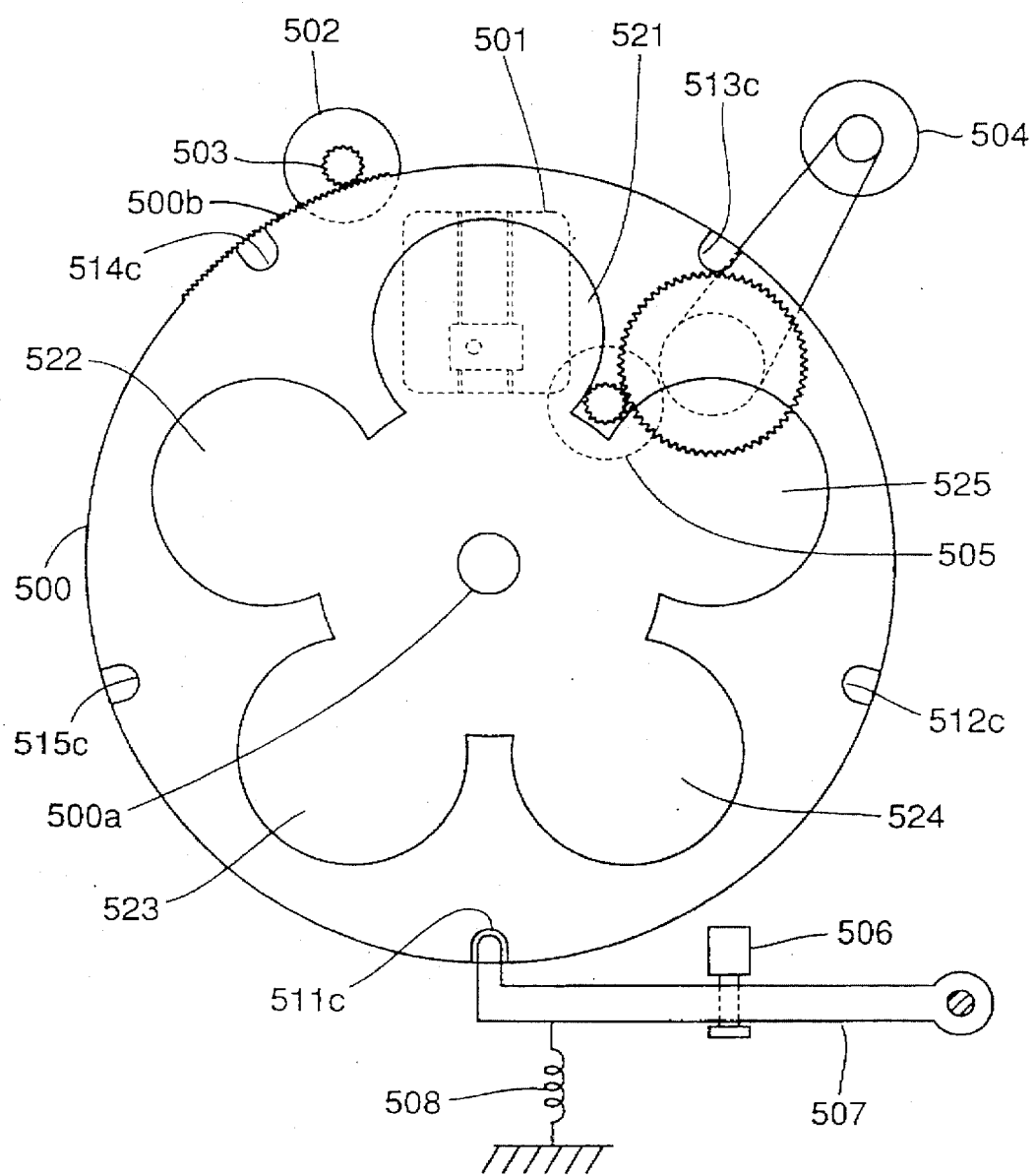
FIG. 20 is a conceptual view for use in illustrating a rotary control means of a conventional disc changer of a roulette system.
Figure 21:
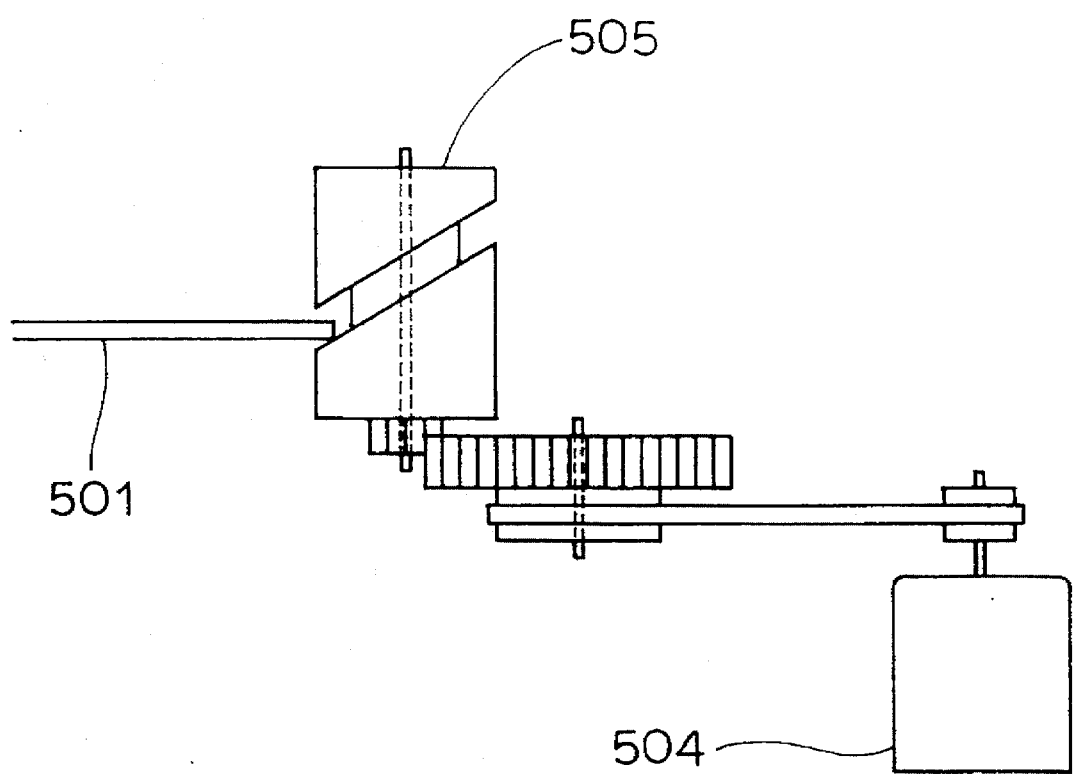
FIG. 21 is a conceptual view showing an elevating and lowering means of a reproducing portion of the conventional disc changer of the roulette system shown in FIG. 20.
Figure 22:
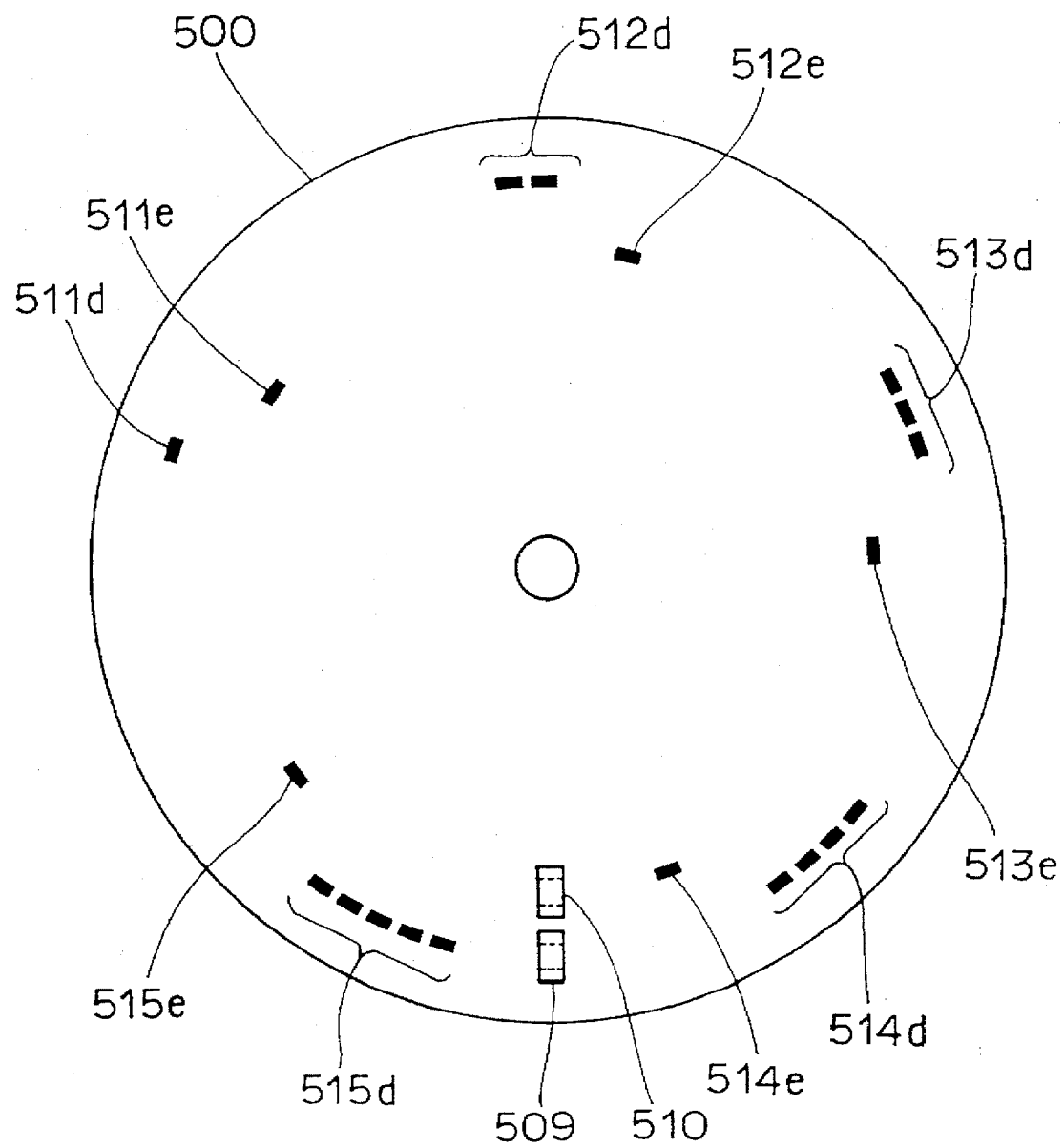
FIG. 22 is a view showing a rear side of a turn table and a layout of sensors for detecting a stop position detecting mark and a disc number detecting mark by two sensors in the conventional disc changer of roulette system.
Figure 23:
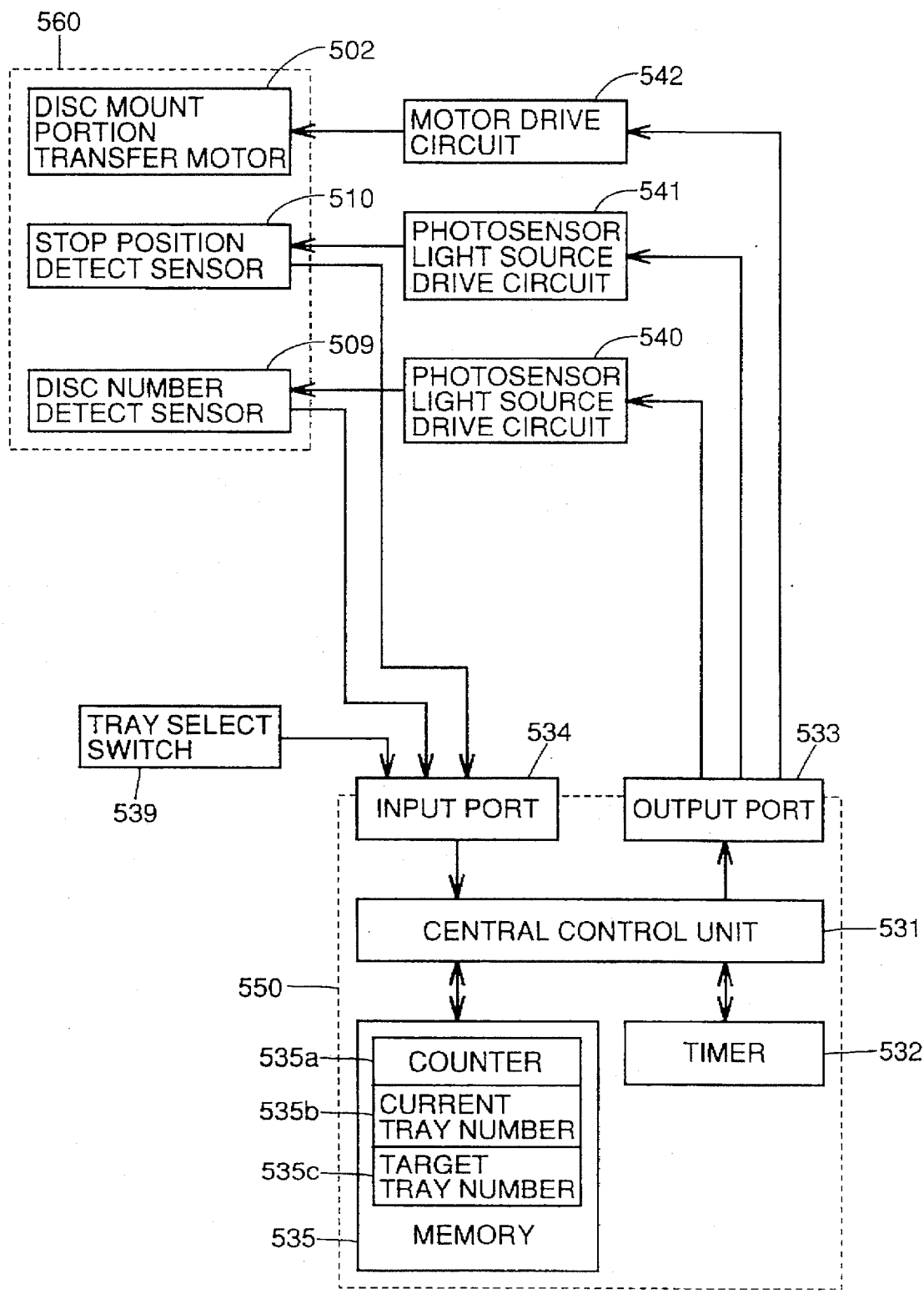
FIG. 23 is a block diagram showing a rotary control means of the conventional disc changer of the roulette system.
Figure 24:
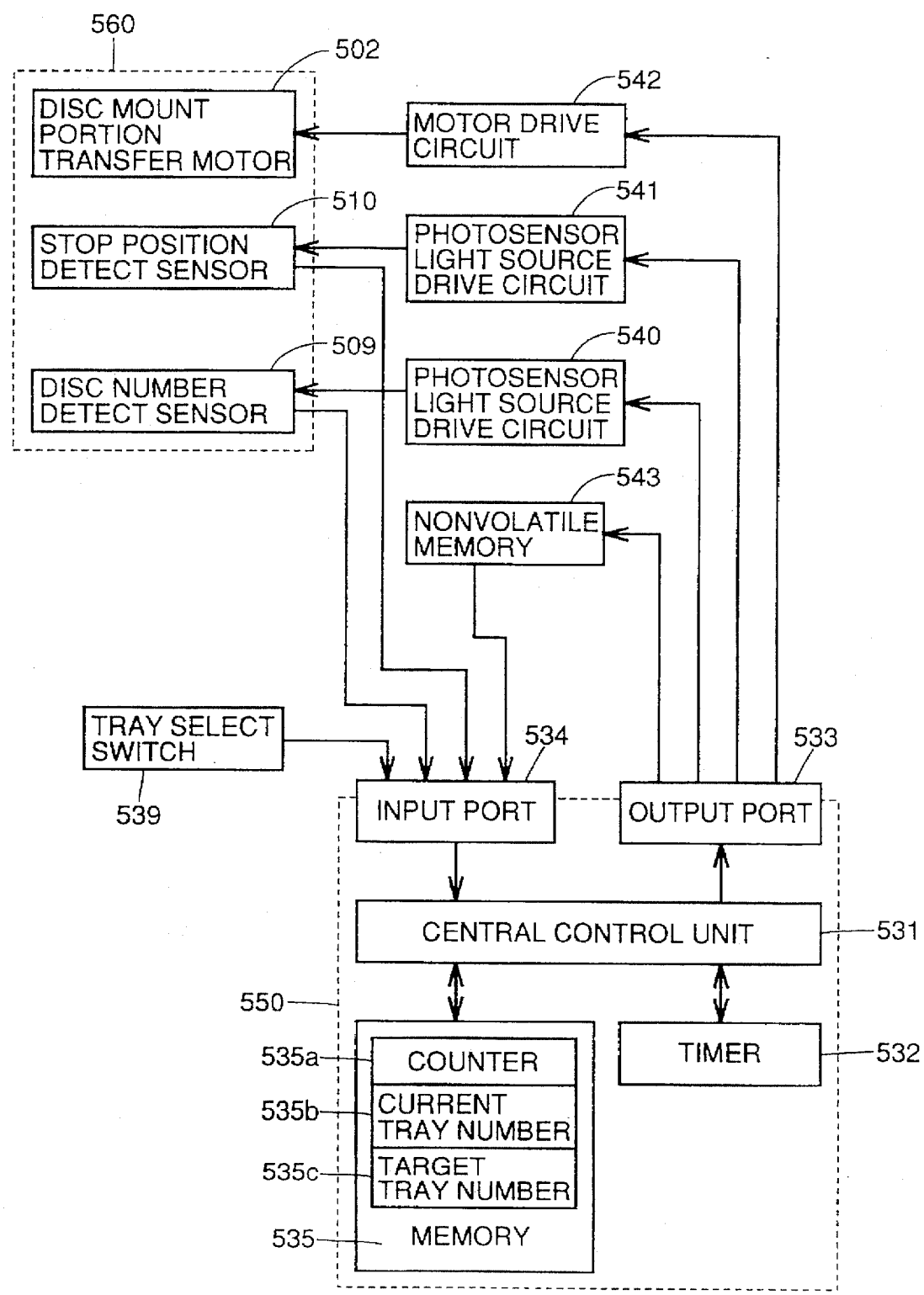
FIG. 24 is a block diagram in the case when the rotary control means of the conventional disc changer of the roulette system has a memory for storing a disc number.
Figure 25:
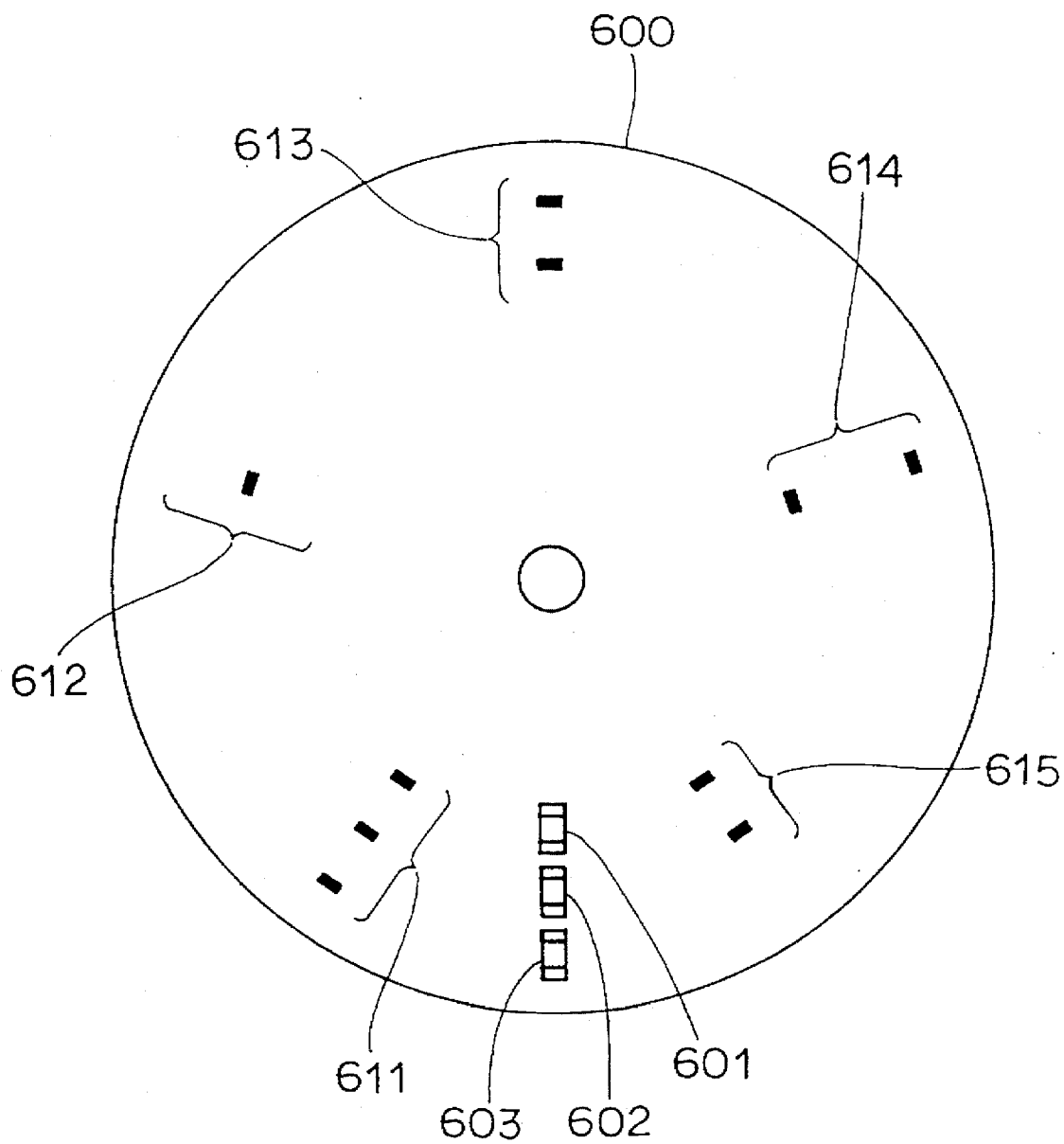
FIG. 25 is a view showing a rear side of a turn table and a layout of sensors for detecting a disc number and a stop position by three sensors in the conventional disc changer of the roulette system.

It is noted that step 110 shown in FIG. 18 is identical to step 110 in FIG. 13.

The presence of key input is confirmed with keeping the stop state in step 212. If there is a key input, the number corresponding to the input key is written in target disc number 52c in step 213.

In step 214, a comparison is made between the values of target tray number 52c and current tray number 52b to determine whether the values are the same. If there is a match, the control returns to the stop state in step 110, otherwise the control proceeds to step 215.

In step 215, a comparison is made between the values of target tray number 52c and current tray number 52b. If the value of target tray number 52c is smaller than the value of current tray number 52b, then the control proceeds to step 216. On the contrary, if the value of target tray number 52c is greater than the value of current tray number 52b, then the control proceeds to step 219.

When motor 44 starts to rotate reversely in step 216, disc tray array 12 starts to operate in the direction of arrow A. Photosensor 43 is enabled to carry out the detect operation in step 217, then the control proceeds to step 154. Subsequently, the processing similar to the above is carried out. In other words, if there is a match between the values of target tray number 52c and current tray number 52b, reproducing unit 8 is elevated to enter the stop state in step 110.

When motor 44 starts to rotate forward in step 219, disc tray array 12 starts to operate in the direction of arrow B.

In step 220, whether or not the current disc number is 1 is confirmed. If the current disc number is 1, then photosensor 43 is enabled to carry out the detect operation in step 223. After waiting for detection of stop position detecting mark n in step 224, the control proceeds to step 154 upon detection. Subsequently, the similar processing as described above is carried out. In other words, if there is a match between the values of target tray number 52c and current tray number. 52b, reproducing unit 8 is elevated to reach the stop state in step 110. This processing is made by taking into consideration that projection n cannot be detected when No. 1 disc tray 13 is in the normal stop position, and projection m can be detected when other No. 2–No. 5 disc trays 14–17 are in the normal stop position. In other words, this processing is intended to wait for the condition in which No. 2–No. 5 disc trays 14–17 are in the normal stop position (i.e., the condition in which the projection is detected) to be attained if No. 1 disc tray 13 is in the normal stop position, and subsequently to carry out the same processing.

If current disc number is not 1 in step 220, photosensor 43 is enabled to carry out the detect operation in step 221. After the control reaches step 154, the similar processing as in the case described above will be carried out. Initialization is not being carried out in step 174, so that whether there is a match between the values of target tray number. 52c and current tray number 52b is confirmed in step 175. If there is a match, reproducing unit 8 is elevated to enter the stop state in step 110.

If there is not a match between the values of target tray number. 52c and current tray number 52b in step 175, a direction in which motor 44 is to be rotated is confirmed by the processings from steps 231 to 236 or the processing from steps 231 to 241. If the reverse rotation is necessary, the waiting time of 100 milliseconds is provided before rotating motor 44 in the reverse direction.

Subsequently, the processings starting from step 154 are repeated. In step 175, it is confirmed whether there is a match between the values of target tray number. 52c and current tray number. 52b. If there is a match, reproducing unit 8 is elevated to enter the stop state in step 110.

Now, a processing for dealing with an error caused by time out of the 5 second timer used as the watchdog timer will be described below.

If the time out flag of the 5 second timer is rendered 1 in the state other than the stop state, photosensor 43 is turned off in step 199. Also, the solenoid is turned off in step 220 and motor 44 is stopped in step 201.

If time out is confirmed in step 203 after setting the 100 millisecond timer in step 202, then the control proceeds to step 204. This 100 millisecond timer serves to provide the waiting time necessary to completely stop the operation of motor 44 which has been rotating forward by its inertia force so that motor 44 can be rotated in the direction reverse to the former direction in step 205 or step 206.

In step 204, a direction in which motor 44 has been rotating until step 201 is confirmed. Then, motor 44 is made to rotate in the direction reverse to the direction in step 205 or 206.

Motor 44 continues rotation until the time out of the 1 second timer set in step 207 occurs in step 208. Then, motor 44 is stopped in step 209, thereby entering a stop state caused by an error in step 210.

Motor 44 is made to rotate in the reverse direction in steps 204 through 208 because of the following reason. In case the compact disc is not placed correctly on the disc tray, the apparatus may come to operate abnormally due to such a factor as the external pressure described above. More specifically, it is possible that the compact disc is sandwiched between disc trays or between a disc tray and a cabinet of an acoustic apparatus in which the apparatus of this embodiment is mounted. In this case, such a sandwiched compact disc can be taken out easily by operating the disc tray in the reverse direction.

Thus, the disc reproducing apparatus of this embodiment is operated as described above.

It is noted that in the disc reproducing apparatus according to one embodiment described above, the projections of the number corresponding to the disc numbers of respective disc trays 13–17 are used as disc numbers detecting marks o; however, the present invention is not limited thereto and a series of projections each having a different width corresponding to the disc number can be provided in respective disc trays 13–17. Also, the disc number detecting mark can be implemented by providing recessed portions instead of projections. Further, the disc reproducing apparatus according to this embodiment described above can be controlled by the conventional turn table system.

As described above, in a disc reproducing apparatus according to one aspect of the present invention, a width of a first portion to be detected serving as a disc number detecting mark is made smaller than a width of a second portion to be detected serving as a stop position detecting mark, and the disc number detecting mark and the stop position detecting mark are provided on a straight line, such that the disc number detecting mark and the stop position detecting mark can be identified and detected by one mark sensor. Thus, operations of the disc reproducing apparatus can be controlled without complicating structure of the apparatus.

In a disc reproducing apparatus according to another aspect of the present invention, a width of a second portion to be detected of a stop position detecting mark is made wider than a width of a first portion to be detected of a disc number detecting mark, such that the disc number detecting mark and the stop position detecting mark can be identified easily by one mark sensor. In the meanwhile, the stop position detecting mark is spaced from the disc number detecting mark by a distance larger than a an interval between adjacent first portions to be detected of the disc number detecting mark, such that an unmarked portion between the disc number detecting mark and the stop position detecting mark can be distinguished easily from an unmarked portion between the adjacent first portions to be detected of the disc number detecting mark. Thus, even if the time taken to detect the first portion to be detected of the disc number detecting mark is made longer due to variation in load or the like, the disc number detecting mark can be identified easily by measuring the time taken to detect a distance provided before the first portion to be detected.

In a disc reproducing apparatus according to still another aspect of the present invention, a width of a second portion to be detected of a stop position detecting mark is made wider than a width of a first portion to be detected of a disc number detecting mark, such that the disc number detecting mark and the stop position detecting mark can be identified easily by one mark sensor. In the meanwhile, the stop position detecting mark is spaced from the disc number detecting mark by a distance larger than an interval between adjacent first portions to be detected of the disc number detecting mark, such that an unmarked portion between the disc number detecting mark and the stopped position detecting mark can be distinguished easily from an unmarked portion between the adjacent first portion to be detected of the disc number detecting mark. More specifically, by providing a first preset time ($T_1$), a comparison is made between the first preset time and the time taken to detect the first portion to be detected or the second portion to be detected, whereby the first portion to be detected of the disc number detecting mark and the second portion to be detected of the stop position detecting mark can be identified easily. Further, by setting a second preset time ($T_2$), if the second preset time is compared with the time taken to detect the unmarked portion between the disc number detecting mark and the stop position detecting mark or the time taken to detect the unmarked portion between the first portions to be detected of the disc number detecting mark, then these two unmarked portions can be identified easily.

In a disc reproducing apparatus according to still another aspect of the present invention, a disc position holding portion is operated so that a portion for prohibiting transfer operation of a reproducing portion is released and a portion for prohibiting disc transfer operation is operated. In the meanwhile, a portion for holding a position of a disc mounting portion is moved from its operative position so that the portion for prohibiting disc transfer operation is released and the portion for prohibiting transfer operation of the reproducing portion is operated. Accordingly, the reproducing portion cannot be moved until the disc transfer operation is completed, and the disc cannot be transferred until the transfer of the reproducing portion is completed. This eliminates the need of a means for confirming completion of respective operations. Thus, the operating time and the number of parts for detection can be reduced.

In a disc reproducing apparatus according to still another aspect of the present invention, a width of a disc number detecting mark and a width of a stop position detecting mark can be provided differently, and a single mark sensor for alternately detecting the stop position detecting mark and the disc number detecting mark is provided. Thus, the stop position detecting mark and the disc number detecting mark can be identified easily, and the disc number can be identified easily by simply moving one disc tray.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc reproducing apparatus, comprising:
    a disc tray array including a plurality of disc trays each having means for placing a disc thereon, said plurality of disc trays being movably connected with each other;
    a disc reproducing portion for reproducing said disc placed on said disc tray selected from said disc tray array;
    a disc tray transfer means for transferring said selected disc tray to said disc reproducing portion, wherein said selected disc tray moves relative to other disc trays of the discs tray array;
    a disc number detecting mark having a longitudinal axis provided in a predetermined position on each of said plurality of disc trays and consisting of at least one first portion to be detected for identifying each of said disc trays;
    a stop position detecting mark having a longitudinal axis provided in a predetermined position on each of said plurality of disc trays and consisting of a second portion to be detected the longitudinal axis of the stop position detecting mark having a width wider than a width along the longitudinal axis of the disc number detecting mark of the first portion to be detected of said disc number detecting mark for detecting said disc tray reaching a predetermined position of said disc reproducing portion;
    a mark sensor for detecting said disc number detecting mark and said stop position detecting mark; and
    a drive control portion responsive to a detection result of said mark sensor for controlling driving of at least said disc tray transfer means, wherein
    said disc number detecting mark and said stop position detecting mark are provided on a straight line along the longitudinal axis of each along a direction of moving of said disc tray.

2. The disc reproducing apparatus according to claim 1, wherein
    a width of the second portion to be detected of the stop position detecting mark of a first disc tray placed on either end of said disc tray array is made smaller than a width of a second portion to be detected of the stop position detecting mark of a disc tray other than said first disk tray,
    when said disc tray other than said first disk tray is placed in a normal reproducing position, the stop position detecting mark of said disc tray other than said first disk tray faces said mark sensor, and
    when said first disc tray is placed in the normal reproducing position, the stop position detecting mark of said first disc tray does not oppose said mark sensor, because one mark is shorter than the other mark,
    said disc reproducing apparatus further comprising
    moving means for moving said disc tray array so that said first disc tray is moved toward a direction of said disc reproducing portion if a power supply switches from an OFF state to an ON state.

3. The disc reproducing apparatus according to claim 1, further comprising
    a tray position detecting sensor for detecting said disc tray being in the normal reproducing position of said disc reproducing portion, wherein
    a width of a second portion to be detected of said stop position detecting mark of a predetermined disc tray from said disc tray array is made smaller than a width of a second portion to be detected of said stop position detecting mark of a disc tray other than said predetermined disk tray,
    when said disc tray other than said predetermined disk tray is placed in the normal reproducing position, the stop position detecting mark of said disc tray other than said predetermined disk tray faces said mark sensor, and when said predetermined disc tray is placed in the normal reproducing position, the stop position detecting mark of said predetermined disc tray does not face said mark sensor.

4. The disc reproducing apparatus according to claim 3, wherein
said predetermined disc tray is a disc tray placed on either end of said disc tray array, said disc reproducing apparatus further comprising:
moving means for moving said disc tray array so that said disc tray placed on said either end is moved toward a direction of said reproducing portion if a power supply switches from an OFF state to an ON state; and
movement prohibiting means for prohibiting movement of said disc tray array when said disc tray placed on said one end is in the normal reproducing position of said disc reproducing portion and the stop position detecting mark of said disc tray does not oppose said mark sensor, if said power supply switches from the OFF state to the ON state.

5. The disc reproducing apparatus according to claim 1, wherein said disc number detecting mark and said stop position detecting mark are projections provided on a back surface of each disc tray.

6. A disc reproducing apparatus, comprising:
a disc tray array including a plurality of disc trays each having means for placing a disc thereon, said plurality of disc trays being movably connected with each other;
a disc reproducing portion for reproducing said disc placed on a disc tray selected from said disc tray array;
disc tray transfer means for transferring said selected disc tray to said disc reproducing portion, wherein said selected disc tray moves relative to other disc trays of the disc tray array;
a disc number detecting mark having a longitudinal axis provided on each of said plurality of disc trays and consisting of at least one first portion to be detected for identifying each of said disc trays;
a stop position detecting mark having a longitudinal axis provided on each of sad plurality of disc trays spaced apart from said disc number detecting mark by a distance larger than an interval between adjacent first portions to be detected of said disc number detecting mark, and consisting of a second portion to be detected, the stop position detecting mark having a width wider along its longitudinal axis than the width of the disc detecting mark along its longitudinal axis, said stop position detecting mark for detecting said disc tray reaching a predetermined position of said disc reproducing portion;
a mark sensor for detecting said number detecting mark and said stop position detecting mark;
a drive control portion responsive to a detection result of said mark sensor for controlling driving of at least said disc tray transfer means;
a timer for measuring a mark detection time required for said mark sensor to detect the first portion to be detected of said disc number detecting mark and the second portion to be detected of said stop position detecting mark and for measuring a detection time of unmarked portions required for said mark sensor to detect unmarked portions other than said first and second portions to be detected; and
determination means for determining whether said detection time of unmarked portions is longer than a predetermined time.

7. A disc reproducing apparatus, comprising:
disc mounting means consisting of a plurality of disc mounting portions;
a disc reproducing portion for reproducing one disc selected from said plurality of discs placed on said disc mounting means;
disc transfer means for transferring a disc mounting portion having said selected disc placed thereon to said disc reproducing portion;
a disc number detecting mark provided corresponding to each of said disc mounting portion and consisting of a first portion to be detected, the number of which corresponding to a tray number of said respective disc mounting portions, for identifying said respective disc mounting portions;
a stop position detecting mark provided corresponding to said respective disc mounting portions, spaced apart from said disc number detecting mark by a distance larger than an interval between adjacent first portions to be detected of said disc number detecting mark, and consisting of a second portion to be detected having a width wider than the width of the first portion to be detected of said disc number detecting mark, said stop position detecting mark being for detecting said disc mounting portion reaching a predetermined position of said disc reproducing portion;
a mark sensor for detecting said disc number detecting mark and said stop position detecting mark;
a timer for measuring a mark detection time required for said mark sensor to detect the first and second portions to be detected of said disc number detecting mark and said stop position detecting mark, and for measuring a detection time of unmarked portions required for said mark sensor to detect unmarked portions other than said first and second portions to be detected;
comparison means for comparing a preset time with the mark detection time and the detection time of unmarked portions measured by said timer;
a counter for counting the number of pulses detected by said mark sensor;
drive control means responsive to output signals from said mark sensor, said timer, said comparison means and said counter for control driving of at least said disc transfer means;
first setting means for setting a first setup time for identifying a first time and a second time such that an expression of $t_1 < T_1 < t_2$ is satisfied, wherein it is assumed that $t_1$ represents said first time required to detect one of the first portion to be detected of said disc number detecting mark and $t_2$ represents said second time required to detect the second portion to be detected of said stop position detecting mark;
second setting means for setting a second setup time so as to identify a third time $t_3$ and a fourth time $t_4$ such that an expression of $t_4 < T_2 < t_3$ is satisfied, wherein $t_3$ represents said third time required to start detection of said stop position detecting mark after completion of detection of said disc number detecting mark, and $t_4$ represents said fourth time required to detect the interval between the adjacent first portions to be detected of said disc number detecting mark;
first determination means for temporarily determining a signal detected after passing by said unmarked portions and before said second setup time elapses as a first signal indicating said disc number detecting mark, and a signal detected after passing by said unmarked portion and after said second setup time elapses as a second signal indicating said stop position detecting mark; and second determination means for temporarily determining a count value of the number of pulses of said first signal as a disc number of the disc tray placed in the reproducing position.

8. The disc reproducing apparatus according to claim 7, further comprising:

third determination means for definitely determining said detected signal as the second signal indicating said stop position detecting mark only when the detection time of said signal is longer than said first preset time after detection of said stop position detecting mark is started; and fourth determination means for definitely determining said count value of the number of pulses of said first signal counted by said counter as said disc number of said disc tray after said third determination means definitely determines said signal as said second signal.

9. The disc reproducing apparatus according to claim 7, further comprising re-recognition means for newly recognizing said signal which is definitely determined as the second signal indicating said stop position detecting mark as the first signal indicating said disc number detecting mark if the detection signal of said mark sensor alternates from a detect state to a non-detect state and from the non-detect state to the detect state, after said count value of the number of pulses of said first signal is definitely determined as said disc number of said disc tray.

10. The disc reproducing apparatus according to claim 7, further comprising:

fifth determination means for determining said first portion to be detected as said disc number detecting mark even if the detection time of a first portion among the first portion to be detected of said disc number detecting mark measured by said mark sensor is longer than said first setup time upon start of detection of said disc number detecting mark.

11. A disc reproducing apparatus which includes a plurality of disc mounting portions and receives a driving force from a driving source for successively moving said disc mounting portions over a disc reproducing portion and for placing an arbitrary disc mounting portion on said disc reproducing portion, comprising:

a stop position detecting mark provided corresponding to each of said disc mounting portions for detecting said disc mounting portion reaching a predetermined position of said disc reproducing portion;

a disc number detecting mark provided in each of said disc mounting portions with a total width of each disc detection mark on each said disc mounting portion being a specific width with respect to each of said disc mounting portions, each width being different from a width of said stop position detecting mark;

said stop position detecting mark and said disc detecting mark being on a straight line along a longitudinal axis of each stop position and disc detection mark;

a single mark sensor for alternately detecting said stop position detecting mark and said disc number detecting mark in accordance with movement of said disc mounting portions; and a drive control portion for controlling movement of said disc mounting portions in response to a detection result of said mark sensor, wherein said disc number detecting mark and said stop position detecting mark are projections located on a back surface of each one of said plurality of disc mounting portions.

* * * * *